United States Patent
Li et al.

(10) Patent No.: US 12,500,687 B2
(45) Date of Patent: Dec. 16, 2025

(54) ENCODING METHOD, DECODING METHOD, AND COMMUNICATION APPARATUS

(71) Applicant: HUAWEI TECHNOLOGIES CO., LTD., Shenzhen (CN)

(72) Inventors: Bin Li, Shenzhen (CN); Jiaqi Gu, Shenzhen (CN); Huazi Zhang, Hangzhou (CN); Wen Tong, Ottawa (CA); Jianmin Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 124 days.

(21) Appl. No.: 18/472,774

(22) Filed: Sep. 22, 2023

(65) Prior Publication Data
US 2024/0014925 A1    Jan. 11, 2024

Related U.S. Application Data

(63) Continuation of application No. PCT/CN2022/083186, filed on Mar. 25, 2022.

(30) Foreign Application Priority Data

Mar. 27, 2021    (CN) .......... 202110329082.4

(51) Int. Cl.
*H04B 7/0413*    (2017.01)
*H04L 1/00*    (2006.01)

(52) U.S. Cl.
CPC ......... *H04L 1/0009* (2013.01); *H04B 7/0413* (2013.01)

(58) Field of Classification Search
CPC ...... H04L 1/009; H04L 1/0009; H04B 7/0413
See application file for complete search history.

(56) References Cited

U.S. PATENT DOCUMENTS 11,196,444 B2 *  12/2021  Chen .............. H03M 13/617
2019/0238268 A1    8/2019  Kim et al.

OTHER PUBLICATIONS

Ma Xuan et al, "Research on Mechanism of Concatenated Codes Based on Polar Codes for 5G Mobile Communication", mobile communication, ISSN: 1006-1010, Dec. 31, 2016, with the Englsih Abstract, total 6 pages.
International Search Report issued in corresponding International Application No. PCT/CN2022/083186, dated Jun. 23, 2022, pp. 1-8.
Wang Ying et al: "Concatenations of polar codes with outer BCH codes and convolutional codes", 2014 52nd Annual Allerton Conference on Communication, Control, and Computing (Allerton), IEEE, Sep. 30, 2014 (Sep. 30, 2014), pp. 813-819, XP032731136.
Extended European Search Report issued in corresponding European Application No. 22778805.6, dated Jul. 12, 2024, pp. 1-13.

* cited by examiner

*Primary Examiner* — Rahel Guarino
(74) *Attorney, Agent, or Firm* — HAUPTMAN HAM, LLP

(57) ABSTRACT

This application provides an encoding method, a decoding method, and a communication apparatus, to improve encoding and decoding performance. The method includes: obtaining n information bit sequences, where n is a quantity of antenna ports, and n is a positive integer greater than 1; performing first channel encoding on the n information bit sequences to obtain n first encoded sequences, where the n first encoded sequences have a same length; generating n second encoded sequences based on a polar encoding matrix and the n first encoded sequences; and outputting the n second encoded sequences.

20 Claims, 8 Drawing Sheets

ENCODING METHOD, DECODING METHOD, AND COMMUNICATION APPARATUS

CROSS-REFERENCE TO RELATED APPLICATIONS

This application is a continuation of International Application No. PCT/CN2022/083186, filed on Mar. 25, 2022, which claims priority to Chinese Patent Application No. 202110329082.4, filed on Mar. 27, 2021. The disclosures of the aforementioned applications are hereby incorporated by reference in their entireties.

TECHNICAL FIELD

Embodiments of this application relate to the field of communication technologies, and in particular, to an encoding method, a decoding method, and a communication apparatus.

BACKGROUND

Communication systems usually adopt channel encoding to improve reliability of data transmission and ensure quality of communication. In a multiple input multiple output (MIMO) technology, a bitstream, on which channel encoding is performed at a transmit end, is transmitted to a receive end over a MIMO channel. The receive end performs corresponding channel decoding on the bitstream.

Currently, channel encoding is usually performed on a long bitstream, and a bit rate of the channel encoding is adapted by using an average signal noise ratio (SNR) of a MIMO channel. Encoded codewords are interleaved and divided into a plurality of sub-streams for transmission over the MIMO channel. However, SNRs of all layers of the MIMO channel are different, and such a manner results in some loss of encoding and decoding performance.

SUMMARY

Embodiments of this application provide an encoding method, a decoding method, and a communication apparatus, to improve encoding and decoding performance.

According to a first aspect, an embodiment of this application provides an encoding method, including: obtaining n information bit sequences, where n is a quantity of antenna ports, and n is a positive integer greater than 1; performing first channel encoding on the n information bit sequences to obtain n first encoded sequences, where the n first encoded sequences have a same length; generating n second encoded sequences based on a polar encoding matrix and the n first encoded sequences; and outputting the n second encoded sequences. In a two-level encoding scheme, independent first channel encoding is first performed on different information bit sequences, and then a polarization operation is performed on a plurality of encoded sequences obtained after the first channel encoding, thereby improving encoding performance.

In an optional implementation, the first channel encoding may take an encoding such as low density parity check (LDPC), parallel concatenated convolutional code (Turbo code), or BCH code (BCH).

In an optional implementation, the polar encoding matrix is a $2^m \times 2^m$ matrix, and n is less than or equal to $2^m$, and m is a positive integer. Optionally, a value of m may meet the following condition: $2^{m-1} \leq n \leq 2^m$.

In an optional implementation, the generating n second encoded sequences based on a polar encoding matrix and the n first encoded sequences includes: if n is equal to $2^m$, performing bit block-based polar encoding on the n first encoded sequences based on the polar encoding matrix, to generate the n second encoded sequences; or if n is less than $2^m$, generating the n second encoded sequences based on a submatrix of the polar encoding matrix and the n first encoded sequences, where the submatrix is a n×n matrix. That based on a submatrix of the polar encoding matrix and the n first encoded sequences includes: performing bit block-based polar encoding on the n first encoded sequences by using the submatrix of the polar encoding matrix.

In this embodiment of this application, a quantity of sequences for performing bit block-based polar encoding is not limited to that n is a power of 2, so that adaptable scenarios can be extended and more flexible channel encoding can be implemented.

In an optional implementation, each row in the polar encoding matrix corresponds to one polar channel; and if n is less than $2^m$, reliability of n polar channels corresponding to the submatrix is higher than reliability of remaining $2^m-n$ polar channels of $2^m$ polar channels. A corresponding polar encoding matrix is transformed based on polar channel reliability, and a polar channel with relatively high reliability is retained, which helps improve encoding performance.

In an optional implementation, better channel quality of multiple input multiple output MIMO layers corresponding to the second encoded sequences indicates better reliability of polar channels corresponding to the second encoded sequences. After the polarization operation, corresponding bitstreams are adapted to MIMO layers having different channel quality levels, so that transmission with a maximum channel capacity can be implemented as much as possible.

In an optional implementation, the method further includes: before the n information bit sequences are obtained, obtaining channel quality corresponding to n MIMO layers.

In an optional implementation, the method further includes: sending a parameter of the first channel encoding. The parameter of the first channel encoding may be used for decoding at the receive end side, which helps improve decoding efficiency at the receive end side.

In an optional implementation, the parameter of the first channel encoding includes at least one of the following: a length of the first encoded sequence, a length of each of the n information bit sequences, and an encoding bit rate for performing the first channel encoding on each of the n information bit sequences.

According to a second aspect, an embodiment of this application provides a decoding method, including: obtaining n to-be-decoded sequences on antenna ports, where the n to-be-decoded sequences have a same length, n is a quantity of antenna ports, and n is a positive integer greater than 1; and decoding the n to-be-decoded sequences based on first channel encoding and a polar encoding matrix, to obtain n information bit sequences. Correspondingly encoding device, configured to perform the two-level encoding scheme at the transmit end side, and corresponding decoding device, configured to perform decoding in reverse based on the first channel encoding and the polar encoding matrix at the receive end side, help improve decoding performance.

In an optional implementation, the first channel encoding may take an encoding such as low density parity check (LDPC), parallel concatenated convolutional code (Turbo code), or BCH code (BCH).

In an optional implementation, the polar encoding matrix is a $2^m \times 2^m$ matrix, and n is less than or equal to $2^m$, and m is a positive integer. Optionally, a value of m may meet the following condition: $2^{m-1} \le n \le 2^m$.

In an optional implementation, the decoding the n to-be-decoded sequences based on first channel encoding and a polar encoding matrix includes: if n is equal to $2^m$, decoding the n to-be-decoded sequences based on the first channel encoding and the polar encoding matrix; or if n is less than $2^m$, decoding the n to-be-decoded sequences based on the first channel encoding and a submatrix of the polar encoding matrix, where the submatrix is a n×n matrix.

In this embodiment of this application, a quantity of to-be-decoded sequences is not limited to that n is a power of 2, so that adaptable scenarios can be extended and more flexible channel decoding can be implemented.

In an optional implementation, each row in the polar encoding matrix corresponds to one polar channel; and if n is less than $2^m$, reliability of n polar channels corresponding to the submatrix is higher than reliability of remaining $2^m-n$ polar channels of $2^m$ polar channels.

In an optional implementation, better channel quality of multiple input multiple output MIMO layers corresponding to the to-be-decoded sequences indicates better reliability of polar channels corresponding to the to-be-decoded sequences.

In an optional implementation, the method further includes: sending channel quality corresponding to n MIMO layers. This facilitates an adaptation to the MIMO layers by outputting the second encoded sequences at the transmit end side, so that transmission with a maximum channel capacity is implemented as much as possible.

In an optional implementation, the method further includes: obtaining a parameter of the first channel encoding. This helps improve decoding efficiency at the receive end side.

In an optional implementation, the parameter of the first channel encoding includes at least one of the following: a length of each of then information bit sequences, an encoding bit rate for performing the first channel encoding on each of the n information bit sequences, and an encoding length of performing the first channel encoding on each of the n information bit sequences.

According to a third aspect, an embodiment of this application provides a communication apparatus, including: a processing module, configured to obtain n information bit sequences, where n is a quantity of antenna ports, and n is a positive integer greater than 1; perform first channel encoding on the n information bit sequences to obtain n first encoded sequences, where the n first encoded sequences have a same length; generate n second encoded sequences based on a polar encoding matrix and the n first encoded sequences; and a communication module, configured to output the n second encoded sequences.

In a two-level encoding scheme, independent first channel encoding is first performed on different information bit sequences, and then a polarization operation is performed on a plurality of encoded sequences obtained after the first channel encoding, thereby improving encoding performance.

In an optional implementation, the first channel encoding may take an encoding such as low density parity check (LDPC), parallel concatenated convolutional code (Turbo code), or BCH code (BCH).

In an optional implementation, the polar encoding matrix is a $2^m \times 2^m$ matrix, and n is less than or equal to $2^m$, and m is a positive integer. Optionally, a value of m may meet the following condition: $2^{m-1} \le n \le 2^m$.

In an optional implementation, the processing module is further configured to: if n is equal to $2^m$, perform bit block-based polar encoding on the n first encoded sequences based on the polar encoding matrix, to generate the n second encoded sequences; or if n is less than $2^m$, generate the n second encoded sequences based on a submatrix of the polar encoding matrix and the n first encoded sequences, where the submatrix is a n×n matrix.

In this embodiment of this application, a quantity of sequences for performing bit block-based polar encoding is not limited to that n is a power of 2, so that adaptable scenarios can be extended and more flexible channel encoding can be implemented.

In an optional implementation, each row in the polar encoding matrix corresponds to one polar channel; and if n is less than $2^m$, reliability of n polar channels corresponding to the submatrix is higher than reliability of remaining $2^m-n$ polar channels of $2^m$ polar channels. A corresponding polar encoding matrix is transformed based on polar channel reliability, and a polar channel with relatively high reliability is retained, which helps improve encoding performance.

In an optional implementation, better channel quality of multiple input multiple output MIMO layers corresponding to the second encoded sequences indicates better reliability of polar channels corresponding to the second encoded sequences. After the polarization operation, corresponding bitstreams are adapted to MIMO layers having different channel quality levels, so that transmission with a maximum channel capacity can be implemented as much as possible.

In an optional implementation, the processing module is further configured to: before the n information bit sequences are obtained, obtain, by using the communication module, channel quality corresponding to n MIMO layers.

In an optional implementation, the communication module is further configured to send a parameter of the first channel encoding. The parameter of the first channel encoding may be used for decoding at the receive end side, which helps improve decoding efficiency at the receive end side.

In an optional implementation, the parameter of the first channel encoding includes at least one of the following: a length of the first encoded sequence, a length of each of the n information bit sequences, and an encoding bit rate for performing the first channel encoding on each of the n information bit sequences.

According to a fourth aspect, an embodiment of this application provides a communication apparatus, including: a communication module, configured to obtain n to-be-decoded sequences, where the n to-be-decoded sequences have a same length, n is a quantity of antenna ports, and n is a positive integer greater than 1; a processing module, configured to decode the n to-be-decoded sequences based on first channel encoding and a polar encoding matrix, to obtain n information bit sequences. Correspondingly encoding device, configured to perform the two-level encoding scheme at the transmit end side, and corresponding decoding device, configured to perform decoding in reverse based on the first channel encoding and the polar encoding matrix at the receive end side, help improve decoding performance.

In an optional implementation, the first channel encoding may take an encoding such as low density parity check (LDPC), parallel concatenated convolutional code (Turbo code), or BCH code (BCH).

In an optional implementation, the polar encoding matrix is a $2^m \times 2^m$ matrix, and n is less than or equal to $2^m$, and m is a positive integer. Optionally, a value of m may meet the following condition: $2^{m-1} \leq n \leq 2^m$.

In an optional implementation, the processing module is further configured to: if n is equal to $2^m$, decode the n to-be-decoded sequences based on the first channel encoding and the polar encoding matrix; or if n is less than $2^m$, decode the n to-be-decoded sequences based on the first channel encoding and a submatrix of the polar encoding matrix, where the submatrix is a n×n matrix.

In this embodiment of this application, a quantity of to-be-decoded sequences is not limited to that n is a power of 2, so that adaptable scenarios can be extended and more flexible channel decoding can be implemented.

In an optional implementation, each row in the polar encoding matrix corresponds to one polar channel; and if n is less than $2^m$, reliability of n polar channels corresponding to the submatrix is higher than reliability of remaining $2^m-n$ polar channels of $2^m$ polar channels.

In an optional implementation, better channel quality of multiple input multiple output MIMO layers corresponding to the to-be-decoded sequences indicates better reliability of polar channels corresponding to the to-be-decoded sequences.

In an optional implementation, the communication module is further configured to obtain a parameter of the first channel encoding. This helps improve decoding efficiency at the receive end side.

In an optional implementation, the parameter of the first channel encoding includes at least one of the following: a length of each of the n information bit sequences, an encoding bit rate for performing the first channel encoding on each of the n information bit sequences, and an encoding length of performing the first channel encoding on each of the n information bit sequences.

According to a fifth aspect, an embodiment of this application provides a communication apparatus, including a processor, where the processor is coupled to a memory, the memory is configured to store a computer program or instructions, and the processor is configured to execute the computer program or the instructions, to implement the method in the first aspect or the second aspect. The memory may be located inside or outside the apparatus. There are one or more processors.

According to a sixth aspect, an embodiment of this application provides a communication apparatus, including: a logic circuit and an input/output interface, where the logic circuit is configured to obtain n information bit sequences, and perform first channel encoding on the n information bit sequences to obtain n first encoded sequences, where the n first encoded sequences have a same length, n is a quantity of antenna ports, and n is a positive integer greater than 1; and the logic circuit is further configured to generate n second encoded sequences based on a polar encoding matrix and the n first encoded sequences; and the input/output interface is configured to output the n second encoded sequences.

According to a seventh aspect, an embodiment of this application provides a communication apparatus, including: a logic circuit and an input/output interface, where the input/output interface is configured to obtain n to-be-decoded sequences, where the n to-be-decoded sequences have a same length, n is a quantity of antenna ports, and n is a positive integer greater than 1; and the logic circuit is configured to decode the n to-be-decoded sequences based on first channel encoding and a polar encoding matrix, to obtain n information bit sequences.

According to an eighth aspect, this application provides a communication apparatus, including: a processor and an interface circuit, where the interface circuit is configured to communicate with another apparatus, and the processor is configured to implement the method in the first aspect or the second aspect.

According to a ninth aspect, this application provides a communication system, including: a network device configured to implement the method in the first aspect or the second aspect, and a terminal device configured to implement the method in the second aspect or the first aspect.

According to a tenth aspect, this application further provides a chip system, including: a processor, configured to implement the method in the first aspect or the second aspect.

According to an eleventh aspect, this application further provides a computing program product, including computer-executable instructions. When the computer-executable instructions are run on a computer, the method in the first aspect or the second aspect is enabled to be implemented.

According to a twelfth aspect, this application further provides a computer-readable storage medium. The computer-readable storage medium stores a computer program or instructions. When the instructions are run on a computer, the method in the first aspect or the second aspect is implemented.

For technical effects that can be achieved in the fifth aspect to the twelfth aspect, refer to descriptions of technical effects that can be brought by the corresponding technical schemes in the first aspect to the second aspect. Details are not described herein again.

DESCRIPTION OF EMBODIMENTS

Embodiments of this application may be applied to a wireless communication network, for example, a 4th generation (4G) network, a 5th generation (5G) network, or a future network. The following further describes this application in detail with reference to the accompanying drawings.

Some terms in this application are first described so as to help a person skilled in the art have a better understanding.

(1) Polar Code

Polar (polar) code encoding is a channel encoding scheme that can be strictly proved to achieve a channel capacity, and has characteristics such as high performance, low complexity, and flexible matching. Currently, it has been determined by a 3rd generation partnership project (3GPP) as a control channel encoding scheme for a 5G control channel enhanced mobile broadband (eMBB) scenario.

Figure 1:
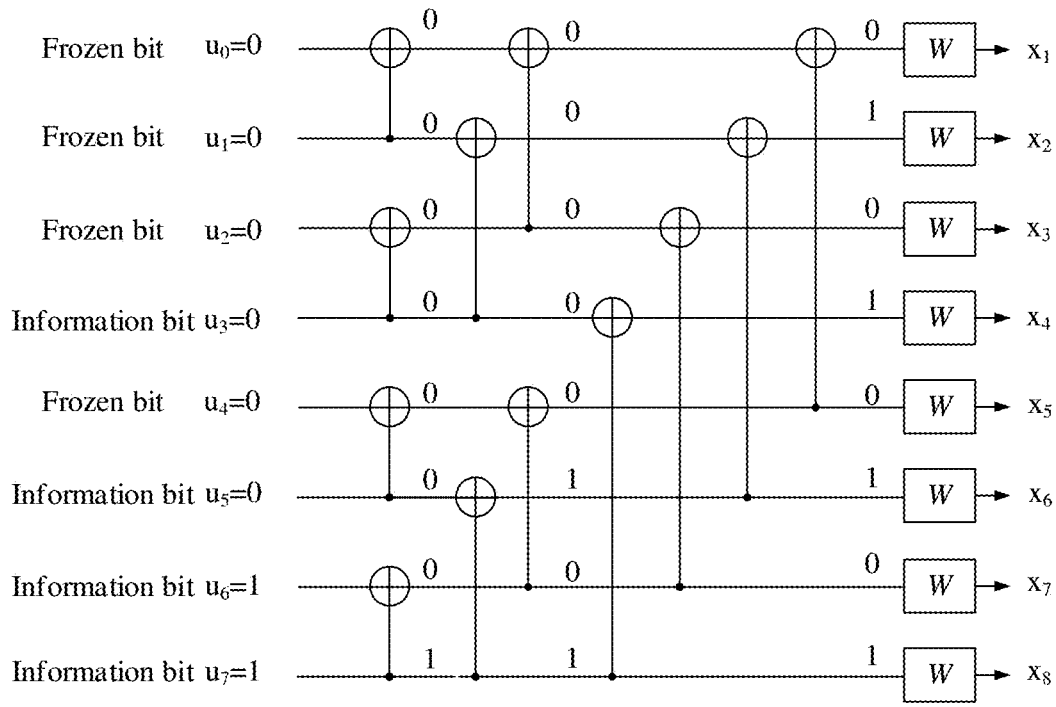
FIG. 1 is a schematic diagram of a process for encoding a polar code.

Refer to FIG. 1. FIG. 1 shows a typical process for encoding a polar code with a length of 8. To-be-encoded bits are classified into two types: frozen bits (frozen) and information bits (data), based on their respective reliability. Generally, a bit with relatively high reliability is set as an information bit (data), a bit with relatively low reliability is set as a frozen bit (frozen), and a value of the frozen bit is generally set to 0, which is known to both a transmit end and a receive end in actual transmission. An encoding length shown in FIG. 1 is 8 bits (bits), and it is shown that $\{u_0, u_1, u_2, u_4\}$ is a location of a frozen bit, and $\{u_3, u_5, u_6, u_7\}$ is a location of an information bit. Each circle in each row represents an exclusive OR operation (or referred to as addition modulo 2) between a bit in the row in which the circle is located and a row reached by the circle, and a bit on the right side of the circle is a sum result.

(2) Polar Encoding Matrix

The polar encoding matrix may also be referred to as a generator matrix $G_N$, or may be denoted as G. $G_N$ is a N×N matrix, and $G_N = F_2^{\otimes(log_2(N))}$. $F_2^{\otimes(log_2(N))}$ is defined as a Kronecker (Kronecker) product of $log_2 N$ matrices of $F_2$. The above matrix $$F_2 = \begin{bmatrix} 1 & 0 \\ 1 & 1 \end{bmatrix}.$$

A process of the polar encoding may also be represented as: $x_1^N = u_1^N G_N$. $u_1^N$ is a 1×N row vector, and the row vector can be represented by transposition of an N×1 column vector in the formula. $u_1^N = (u_1, u_2, \ldots, u_N)$, where N is the encoding length, and N is an integer greater than or equal to 1.

In one manner, $u_i$ is a bit before encoding, and i is an integer between 1 and N. $u_1^N$ includes information bits and/or frozen bits. To be specific, $u_i$ may be information bits or frozen bits. For example, corresponding to the process of the polar encoding shown in FIG. 1, it may be represented as:

$$x_1^8 = u_1^8 G_8 = \begin{bmatrix} 0 \\ 0 \\ 0 \\ u_3 \\ 0 \\ u_5 \\ u_6 \\ u_7 \end{bmatrix}^T \begin{bmatrix} 1 & 0 & 0 & 0 & 0 & 0 & 0 & 0 \\ 1 & 1 & 0 & 0 & 0 & 0 & 0 & 0 \\ 1 & 0 & 1 & 0 & 0 & 0 & 0 & 0 \\ 1 & 1 & 1 & 1 & 0 & 0 & 0 & 0 \\ 1 & 0 & 0 & 0 & 1 & 0 & 0 & 0 \\ 1 & 1 & 0 & 0 & 1 & 1 & 0 & 0 \\ 1 & 0 & 1 & 0 & 1 & 0 & 1 & 0 \\ 1 & 1 & 1 & 1 & 1 & 1 & 1 & 1 \end{bmatrix}$$

where $u_1^8$ is a 1×8 row vector, and the row vector is represented by transposition of an 8×1 column vector in the formula.

In another manner, alternatively, $u_i$ may be a bit sequence (or a bit block) before encoding, and i is an integer between 1 and N. One bit sequence may include one or more bits. The foregoing another manner may also be referred to as bit block-based polar encoding. In other words, bit block-based polar encoding may be implemented in the foregoing another manner.

(3) Multiple Input Multiple Output (MIMO) Technology

MIMO, an abstract mathematical model, describes multi-antenna wireless communication. A plurality of antennas are arranged at both the transmit end and the receive end, so that signals are transmitted and received through the plurality of antennas at the transmit end and the receive end. To be specific, a plurality of antennas are configured at the transmit end to transmit signals independently. In addition, a plurality of antennas are configured at the receive end to receive and restore original information. The MIMO technology can greatly improve the channel capacity and can effectively improve spectral efficiency. MIMO may also be understood as a multi-antenna technology. Let $M_t$ is a quantity of transmit antennas, $M_r$ is a quantity of receive antennas, and a channel matrix H is also a $M_r \times M_t$ matrix. Common antenna configurations include, such as 1×2, 2×2, 2×4, 4×2, and 4×4, which constitute MIMO channels such as 1×2, 2×2, 2×4, 4×2, and 4×4. In embodiments of this application, the quantity of the transmit antennas, $M_t$, may also be understood as a quantity of antenna ports at the transmit end. In addition, the quantity of the receive antennas, $M_r$, may be understood as a quantity of antenna ports at the receive end. An antenna port is a logical concept. An antenna port (antenna port) may be a physical antenna, or may be a combination of a plurality of physical antennas. In addition, in a broad sense, single input single output (SISO), single input multiple output (SIMO), and multiple input single output (MISO) may also be considered as special cases of MIMO.

Figure 2:
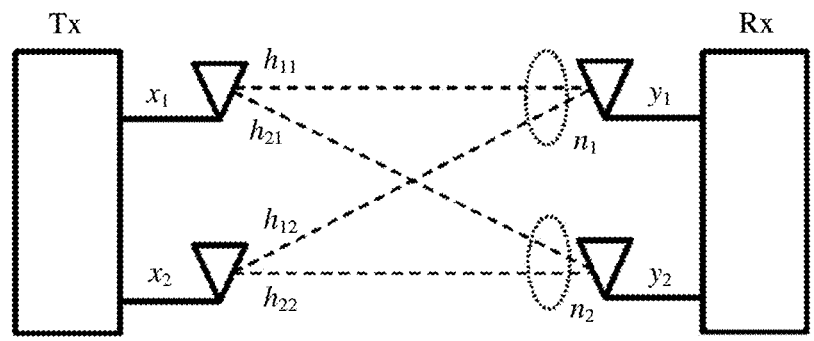
FIG. 2 is a schematic diagram of a communication architecture of a MIMO channel.

The transmit end outputs a plurality of bitstreams to the antenna port. The plurality of bitstreams are transmitted over the MIMO channel. The receive end receives the bitstreams on the antenna port. Different bitstreams may correspond to different MIMO layers. It may be understood that a quantity of the MIMO layers depends on a quantity of the bitstreams, and a quantity of the bitstreams is consistent with a quantity of information bit sequences on which channel encoding needs to be performed at the transmit end side. The quantity of the bitstreams is less than or equal to a smaller value of the quantity of the antenna ports at the transmit end side and the quantity of the antenna ports at the receive end side. For example, a 4×2 MIMO channel is used as an example, a quantity of bitstreams may be 2 or 1, and a quantity of MIMO layers may be consistent with the quantity of bitstreams, and both are 2 or 1. Alternatively, a 2×4 MIMO channel is used as an example, a quantity of bitstreams may be 2 or 1, and a quantity of MIMO layers may be consistent with the quantity of bitstreams, and both are 2 or 1. In embodiments of this application, a bitstream may also be understood as a related encoded sequence. For example, a transmitted sequence at the transmit end side is a second encoded sequence, and a received sequence at the receive end side is a to-be-decoded sequence. For example, referring to a communication architecture of a 2×2 MIMO channel shown in FIG. 2, Tx represents the transmit end, Rx represents the receive end, and a mathematical model of the 2×2 MIMO is shown as:

$$\begin{bmatrix} y_1 \\ y_2 \end{bmatrix} = \begin{bmatrix} h_{11} & h_{12} \\ h_{21} & h_{22} \end{bmatrix} \begin{bmatrix} x_1 \\ x_2 \end{bmatrix} + \begin{bmatrix} n_1 \\ n_2 \end{bmatrix} \quad (1)$$

where $$x = \begin{bmatrix} x_1 \\ x_2 \end{bmatrix}$$

is a transmit information vector, $$y = \begin{bmatrix} y_1 \\ y_2 \end{bmatrix}$$

is a receive information vector, $$n = \begin{bmatrix} n_1 \\ n_2 \end{bmatrix}$$

is a noise vector, $$H = \begin{bmatrix} h_{11} & h_{12} \\ h_{21} & h_{22} \end{bmatrix}$$

is a channel matrix of 2×2, and $h_{i,j}$ is a channel fading coefficient from the transmit antenna i to the receive antenna j.

The relationship between received data and transmitted data may be expressed as:

$$y = Hx + n \quad (2)$$

(4) Multi-User Detection (MUD)

The MUD technology is a scheme that can both effectively eliminate multiple access interference (MAI) and resist a near-far effect, thereby improving system performance. Conventionally, a receive end detects a single user. The disadvantage is that when detecting a user, the known information of other users is not used. The basic problem to be solved by the MUD technology is to make full use of information of all users who cause mutual interference based on a conventional detection technology. To be specific, a signal of another user other than a current user is processed as a useful signal instead of interfering signal, thereby improving performance of detecting a specific user.

An optimal multi-user detector is a maximum likelihood (ML) detector, which has excellent performance but huge complexity, and is impossible to achieve in practical engineering. Therefore, the main research direction of the MUD mainly focuses on sub-optimal multi-user detectors. Common multi-user detectors include: a zero forcing (ZF) detector, a minimum mean square error (MMSE) detector, a successive interference cancellation (SIC) detector, a parallel interference cancellation (PIC) detector, a minimum mean square error-successive interference cancellation MMSE-SIC detector, a minimum mean square error-parallel interference cancellation MMSE-PIC detector, and the like.

(5) In embodiments of this application, a plurality of means two or more. The term "and/or" describes an association relationship for describing associated objects and represents that three relationships may exist. For example, A and/or B may represent the following three cases: only A exists, both A and B exist, and only B exists. The character "/" generally indicates an "or" relationship between the associated objects. In addition, it should be understood that although terms such as "first" and "second" may be used in embodiments of the present invention to describe objects, these objects are not limited by these terms. These terms are merely used to distinguish the objects from each other.

(6) Terms "including", "having", and any other variant thereof mentioned in descriptions of embodiments of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that, in embodiments of this application, the terms such as "example" or "for example" are used to represent giving an example, an illustration, or a description. Any embodiment or design scheme described as an "example" or "for example" in embodiments of this application should not be explained as being more preferred or having more advantages than another embodiment or design scheme. Exactly, use of the terms such as "example" or "for example" is intended to present a relative concept in a specific manner.

The following briefly describes related encoding and decoding technologies.

Figure 3:
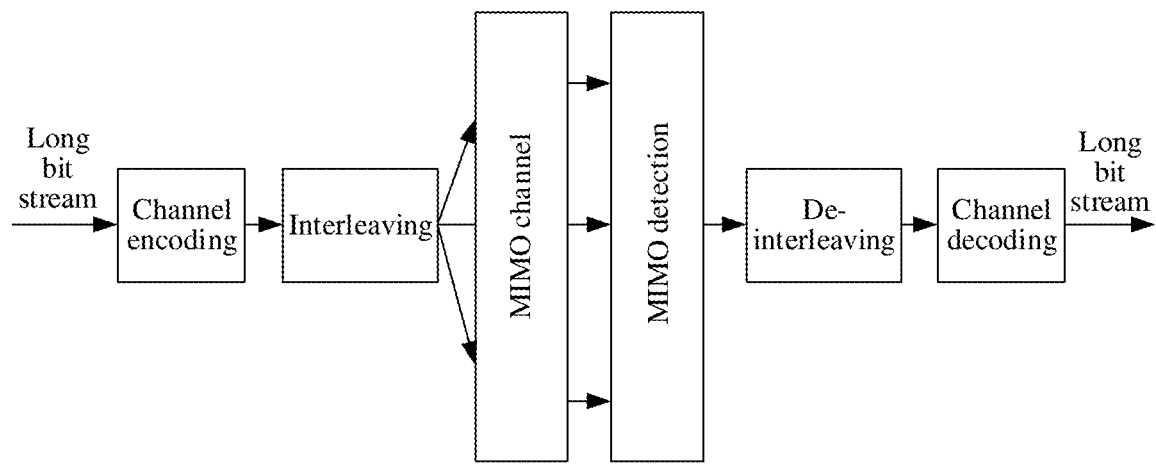
FIG. 3 is a schematic flowchart of an encoding and decoding scheme.

Technical scheme 1: Refer to FIG. 3. FIG. 3 is a schematic flowchart of an encoding and decoding scheme. At the transmit end, channel encoding (channel encode) is performed on a complete long bitstream. An encoded codeword is interleaved (interleave) and divided into a plurality of sub-streams, and these sub-streams are sent to the MIMO channel (FIG. 3 illustrates a 4×4 MIMO channel) for transmission. At the receive end, the bitstreams are first detected by a MIMO detector (detector), and then detected sequences of the bitstreams are combined and the combined bitstreams are de-interleaved (de-interleave) to be sent into a channel decoder (channel decoder).

Because channel encoding is performed on the complete long bitstream, corresponding bit rates during channel encoding are adapted by using an SNR selected. Generally, an average SNR of the MIMO channel is used for adaptation. However, actually, SNRs of individual MIMO layers are different, and sub-streams from a same large code (to be specific, the foregoing complete long bitstream) are transmitted at all MIMO layers, resulting in a loss of encoding and decoding performance.

Figure 4:
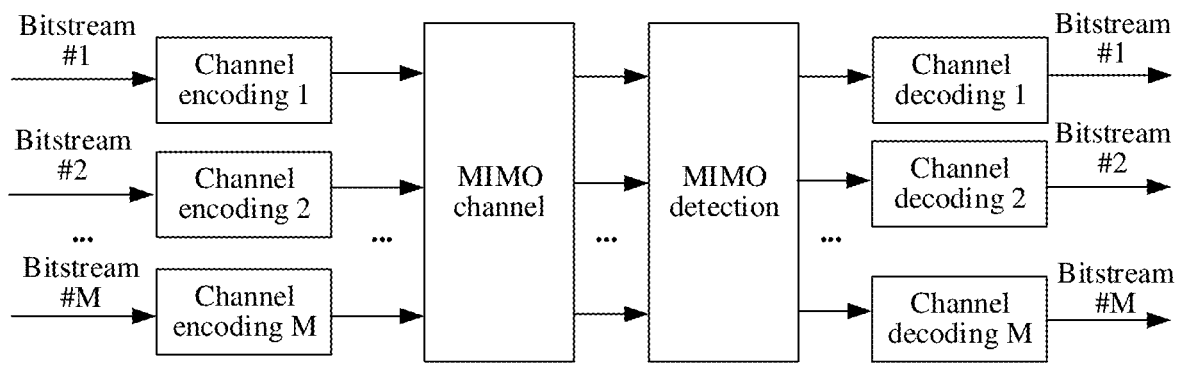
FIG. 4 is a schematic flowchart of another encoding and decoding scheme.

Technical scheme 2: Refer to FIG. 4. FIG. 4 is a schematic flowchart of another encoding and decoding scheme. At the transmit end, channel encoding is separately performed on a plurality of sub-streams obtained by dividing the long bitstream, and then a plurality of encoded codewords are sent to the MIMO channel for transmission. At the receive end, the individual streams are first detected by a MIMO detector (detector), and then detected streams are sent into a corresponding channel decoder for decoding, to obtain corresponding decoded sub-streams.

When channel encoding is performed on the plurality of sub-streams, bit rates of channel encoding corresponding to different sub-streams may be adapted by using SNRs of different layers of the MIMO channel. For example, a bitstream with a higher SNR may correspond to a higher bit rate, and a bitstream with a lower SNR may correspond to a lower bit rate. Compared with Technical scheme 1, this scheme can avoid a loss of encoding and decoding performance caused by using the average SNR to adapt the bit rates. However, an encoding length of each bitstream is relatively short, resulting another performance loss, for example, a relatively poor encoding gain.

Based on this, embodiments of this application provide an encoding method and a decoding method. At a transmit end, first channel encoding is separately performed on a plurality of bitstreams, and a plurality of codewords obtained after the first channel encoding are re-encoded based on a polar encoding matrix for transmission. At a receive end, corresponding channel decoding is performed. Therefore, the encoding and decoding performance can be improved.

Embodiments of this application may be applied to a plurality of wireless communication fields that require channel encoding. For example, the foregoing wireless communication field may include but is not limited to a 5G communication system, a future communication system (such as a 6G communication system), a satellite communication system, a device-to-device (D2D) communication system, a machine to machine (M2M) communication system, an Internet of Things (IoT), a drone communication system, a narrow band-Internet of Things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division-synchronization code division multiple access (TD-SCDMA) system, a long term evolution (LTE) system, and three application scenarios for a 5G mobile communication system: eMBB, ultra reliable low latency communication (URLLC), and massive machine-type communications (mMTC).

Figure 5:
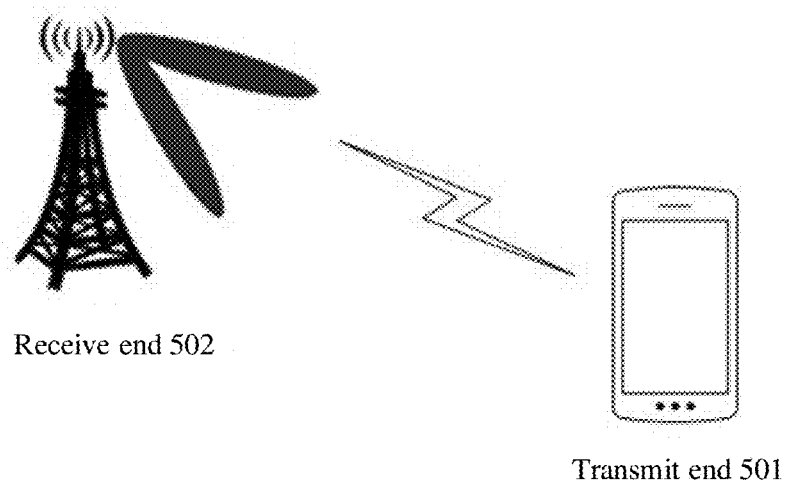
FIG. 5 is a schematic diagram of an architecture of a communication system according to an embodiment of this application.

With reference to FIG. 5, the following describes a communication system to which an encoding and decoding method provided in an embodiment of this application is applicable. Referring to an architecture of a communication system shown in FIG. 5, the communication system includes a transmit end 501 and a receive end 502. The transmit end 501 may be a network device or a terminal device, and the receive end 502 may be a network device or a terminal device. Optionally, when the transmit end 501 is a network device, the receive end 502 may be a terminal device. When the receive end 502 is a network device, the transmit end 501 may be a terminal device. For example, FIG. 5 shows that the transmit end 501 is a terminal device, and the receive end 502 is a network device.

The terminal device may also be referred to as user equipment (UE) or a station (STA), an access terminal, a terminal unit, a terminal station, a mobile station, a mobile console, a remote station, a remote terminal, a mobile device, a mobile terminal, a terminal, a wireless communication device, a terminal agent, or a terminal apparatus, or the like. For example, the terminal device may be a cellular phone, a cordless phone, a session initiation protocol (SIP) phone, a wireless local loop (WLL) station, a personal digital assistant (PDA), a handheld device with a wireless communication function, a computing device, or another processing device connected to a wireless modem, an entire vehicle, an in-vehicle device or an in-vehicle module, a terminal device in a 5G network, or a terminal device in a future evolved PLMN network, or the like. Alternatively, the terminal device may be: a mobile phone (mobile phone), a tablet computer, a notebook computer, a handheld computer, a mobile Internet device (MID), a wearable device, a virtual reality (VR) device, an augmented reality (AR) device, a wireless terminal in industrial control (industrial control), a wireless terminal in self-driving (self-driving), a wireless terminal in remote medical surgery (remote medical surgery), a wireless terminal in smart grid (smart grid), a wireless terminal in transportation safety (transportation safety), a wireless terminal in a smart city (smart city), or a wireless terminal in a smart home (smart home), a drone, a balloon, an aircraft, a satellite, or the like.

The network device may also be referred to as an access network device, a base station, a relay station or an access node (AN), a wireless access point (AP), or the like. For example, the network device may be a base transceiver station (BTS) in a global system for mobile communications (GSM) or a code division multiple access (CDMA) network. Alternatively, it may be an NB (NodeB) in a wideband code division multiple access (WCDMA) network, or may be eNB or eNodeB (evolved NodeB) in a long term evolution (LTE) system. Alternatively, the network device may be a radio controller in a cloud radio access network (CRAN) scenario. Alternatively, the network device may be a base station device in a 5G network or a network device in a future evolved PLMN network. Alternatively, the network device may be a wearable device or an in-vehicle device.

Figure 6:
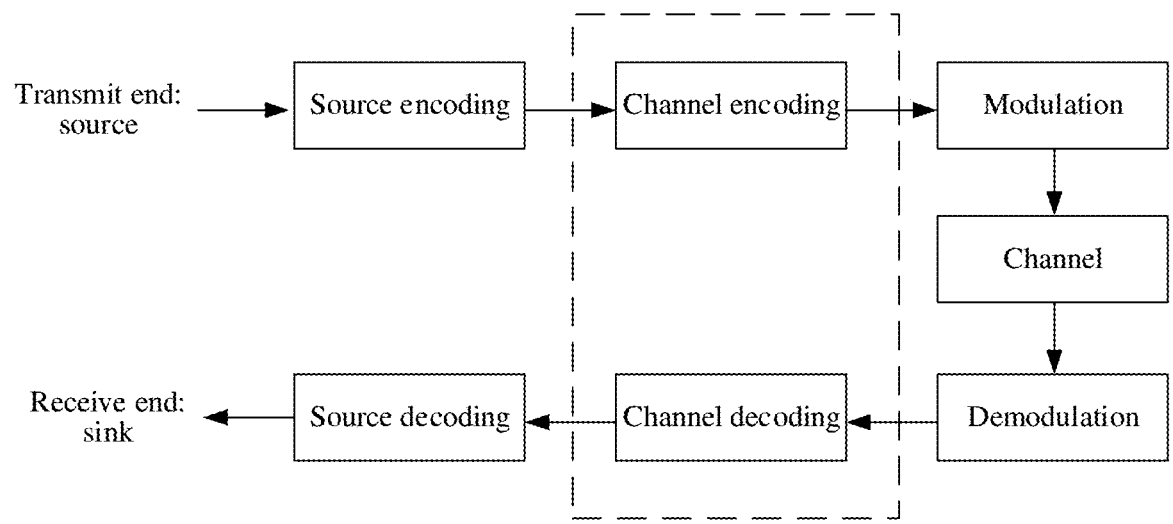
FIG. 6 is a schematic diagram of interaction between a transmit end and a receive end according to an embodiment of this application.

Further, refer to FIG. 6. FIG. 6 is a schematic diagram of interaction between a transmit end and a receive end. A source of the transmit end is transmitted over a channel after sequential source encoding, channel encoding, rate matching, and modulation. After receiving the signal, the receive end obtains a sink through demodulation, rate de-matching, channel decoding, and source decoding. The channel in this embodiment of this application is a MIMO channel. The encoding method provided in this embodiment of this application may be deployed in a channel encoding phase on a transmit end side. The decoding method provided in this embodiment of this application may be deployed in a channel decoding phase on a receive end side. The following describes in detail an encoding method and a decoding method provided in this application.

Figure 7:
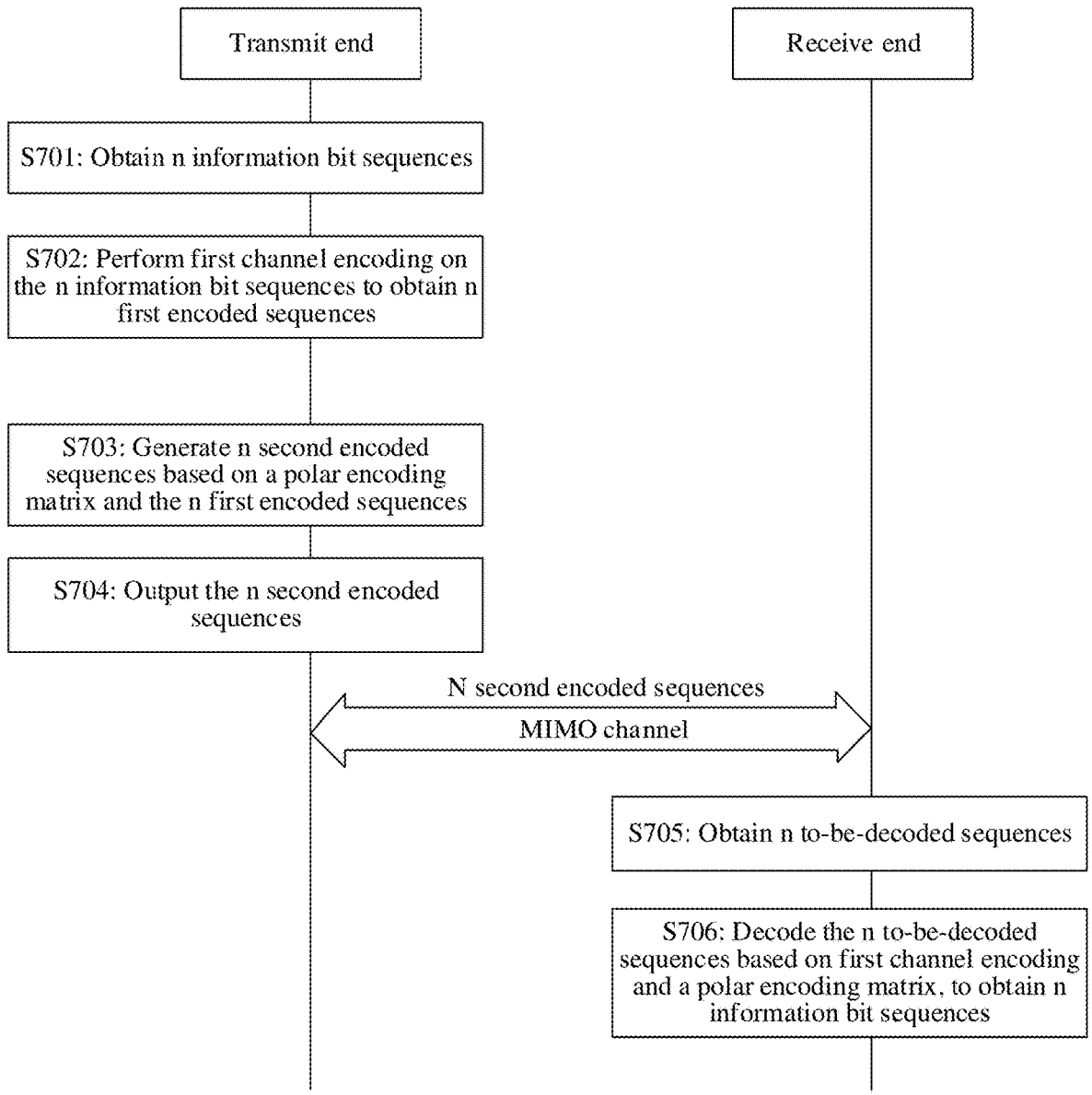
FIG. 7 is a schematic flowchart of an encoding method and a decoding method according to an embodiment of this application.

Refer to FIG. 7. FIG. 7 is a procedure of an encoding method and a decoding method. The encoding method is performed at a transmit end, and the decoding method is performed at a receive end. The procedure mainly includes the following steps.

S701: The transmit end obtains n information bit sequences.

The information bit sequences may also be referred to as to-be-encoded sequences, bitstreams, or the like. Different information bit sequences may have same or different lengths. Alternatively, it may be understood that each information bit sequence may include one or more bits, and different information bit sequences may include same or different quantities of bits.

Optionally, a quantity of bits included in each of the n information bit sequences may be determined by channel quality corresponding to each MIMO layer. In an optional implementation, a correspondence between an SNR of each MIMO layer and an information bit sequence may be set. Lengths of different information bit sequences are determined based on the correspondence. An information bit sequence corresponding to a low SNR is short, and an information bit sequence corresponding to a high SNR is long. In another optional implementation, a difference between lengths of the n information bit sequences may be determined based on a difference between SNRs of all the MIMO layers. A length of each information bit sequence is configured based on the difference. For example, a ratio between lengths of the n information bit sequences is configured based on the difference between SNRs of all the MIMO layers.

Optionally, the channel quality corresponding to each MIMO layer may be determined by the receive end based on a MIMO detection process. For example, the receive end obtains a plurality of bitstreams (or sequences) through MIMO detection, and determines, based on the plurality of bitstreams, an SNR of a MIMO layer corresponding to each bitstream. The receive end may feed back the channel quality (for example, SNR) determined by the receive end and corresponding to each MIMO layer (or referred to as each sub-channel) to the transmit end. In an optional implementation, before n information bit sequences are obtained, the transmit end may first obtain channel quality fed back by the receive end, and then determine a length of each information bit sequence based on the channel quality fed back by the receive end.

S702: The transmit end performs first channel encoding on the n information bit sequences to obtain n first encoded sequences, where the n first encoded sequences have a same length, and n is a positive integer greater than 1.

Optionally, the first channel encoding may be low density parity check (LDPC), parallel concatenated convolutional code (Turbo code), BCH code (BCH), or another encoding scheme.

Optionally, the transmit end may further send a parameter of the first channel encoding to the receive end. For example, the transmit end sends related messages to the receive end. The related messages may include a message about the parameter of the first channel encoding. Alternatively, the related messages include indication information indicating the parameter of the first channel encoding. The parameter of the first channel encoding may be used for decoding at the receive end side.

Optionally, the parameter of the first channel encoding includes at least one of the following: a length of each of the n information bit sequences, an encoding bit rate for performing the first channel encoding on each of the n information bit sequences, and an encoding length of performing the first channel encoding on each of the n information bit sequences. In addition, the parameter of the first channel encoding may further include another parameter that can represent the scheme of the first channel encoding. This is not limited in this embodiment of this application.

S703: The transmit end generates n second encoded sequences based on a polar encoding matrix and the n first encoded sequences.

Optionally, the polar encoding matrix may represent a matrix having a size of $2^m \times 2^m$ where n is less than or equal to $2^m$, and m is a positive integer. Further, n may be set to be greater than $2^{m-1}$. For example, if n is not a positive integer to the power of 2, a value of m may meet the following condition: $n<2^m$, or $2^{m-1}<n<2^m$, or $m \geq [\log_2 n]$. If n is a positive integer to the power of 2, then $n=2^m$, or $m=\log_2 n$. In addition, optionally, in other words, the polar encoding matrix may alternatively represent a matrix having a size of $2^{\lceil \log_2 n \rceil} \times 2^{\lceil \log_2 n \rceil}$, where $[\cdot]$ represents a round-up operator.

Optionally, that the transmit end generates the n second encoded sequences may be implemented with reference to the following Manner 1 or Manner 2.

Manner 1: if n is equal to $2^m$, the transmit end performs bit block-based polar encoding on the n first encoded sequences based on the polar encoding matrix, to generate the n second encoded sequences.

Manner 2: if n is less than $2^m$, the transmit end generates the n second encoded sequences based on a submatrix of the polar encoding matrix and the n first encoded sequences, where the submatrix is a n×n matrix.

Optionally, in Manner 2, each row in the polar encoding matrix corresponds to one polar channel. If n is less than $2^m$, reliability of n polar channels corresponding to the submatrix is higher than reliability of remaining $2^m - n$ polar channels of $2^m$ polar channels.

Optionally, a manner that the transmit end generates the n second encoded sequences in Manner 2 may be: The transmit end performs bit block-based polar encoding on the n first encoded sequences based on the submatrix of the polar encoding matrix, to generate the n second encoded sequences.

Optionally, encoders may be deployed at the transmit end side, for example, may be referred to as polar-type codes (polar-type codes). The encoders include outer code encoder (outer codes) and inner code encoder (inner codes). The outer code encoder is responsible for implementing the foregoing first channel encoding. Corresponding to the n information bit sequences, the outer code encoder may include n channel encoders, to independently implement the first channel encoding on the n information bit sequences. The n channel encoders separately output the first encoded sequences to the inner code encoder, and the inner code encoder is responsible for implementing bit block-based polar encoding on the n first encoded sequences to generate n second encoded sequences. The foregoing implementations related to bit block-based polar encoding are described in detail in subsequent Example 1 to Example 3.

S704: The transmit end transmits the n second encoded sequences to a MIMO channel between the transmit end and the receive end for transmission.

Optionally, the MIMO channel between the transmit end and the receive end may be represented as a MIMO channel of $M_t \times M_r$. $M_t$ may represent the quantity of antennas (antenna ports) of the transmit end, and $M_r$ may represent the quantity of antennas (antenna ports) of the receive end. Both $M_t$ and $M_r$ are positive integers. Optionally, values of $M_t$ and $M_r$ may be the same or different.

In an optional implementation, if n is equal to $M_t$, the transmit end may output the n second encoded sequences to the n antenna ports.

In another optional implementation, if n is not equal to $M_t$, the transmit end may perform precoding on the n second encoded sequences to obtain $M_t$ third encoded sequences, and then output the $M_t$ third encoded sequences to $M_t$ antenna ports. The precoding processing may be implemented based on a precoding matrix.

For example, FIG. 7 shows a case in which n is equal to $M_t$, as shown in S704: the transmit end outputs n second encoded sequences, and the n second encoded sequences are transmitted to the receive end over the MIMO channel.

Optionally, each MIMO bitstream (for example, the foregoing second encoded sequence) may use a same or different rate matching schemes. This is not limited in this embodiment of this application. A bit rate of a bitstream (for example, the second encoded sequence) corresponding to each MIMO channel cannot exceed a maximum capacity of the channel.

Optionally, for each of the n second encoded sequences, better channel quality of MIMO layers corresponding to the second encoded sequences indicates better reliability of polar channels corresponding to the second encoded sequences.

S705: The receive end may obtain $M_r$ to-be-decoded sequences, for example, obtain to-be-decoded sequences through $M_r$ antenna ports. $M_r$ may be n or not be n, and $M_r$ may be the same as or different from a value of $M_t$. The $M_r$ to-be-decoded sequences have a same length. As shown in FIG. 7, when $M_r$ is n, the receive end specifically obtains n to-be-decoded sequences.

The to-be-decoded sequences obtained by the receive end at the antenna port may also be referred to as received sequences. The to-be-decoded sequences may alternatively be understood as second encoded sequences received by the receive end based on the antenna port. It should be noted that, the quantity of second encoded sequences received by the receive end based on the antenna port and the quantity of second encoded sequences output by the transmit end to the antenna port may be the same or different, depending on whether the quantities of antenna ports of the transmit end and the receive end are the same. In other words, it depends on whether a quantity of transmit antennas and a quantity of receive antennas corresponding to the MIMO channel are the same. For example, if the transmit end and the receive end have the same quantity of antenna ports, the quantity of second encoded sequences received by the receive end based on the antenna ports is the same as the quantity of second encoded sequences output by the transmit end to the antenna ports. If the transmit end and the receive end have different quantity of antenna ports, the quantity of second encoded sequences received by the receive end based on the antenna ports is different from the quantity of second encoded sequences output by the transmit end to the antenna ports.

S706: The $M_r$ to-be-decoded sequences are decoded based on first channel encoding and a polar encoding matrix, to obtain n information bit sequences. As shown in FIG. 7, when $M_r$ is n, the receive end specifically decodes n to-be-decoded sequences, to obtain n information bit sequences.

In an optional implementation, the $M_r$ to-be-decoded sequences may be decoded in the following manner. First, the $M_r$ to-be-decoded sequences are detected to obtain n to-be-decoded sequences (corresponding to n second encoded sequences at the transmit end side). The n to-be-decoded sequences are then decoded, based on the first channel encoding and the polar encoding matrix, to obtain n information bit sequences. In another optional implementation, the $M_r$ to-be-decoded sequences may be decoded in the following manner. Through both the detecting and the decoding processes, the n second encoded sequences are detected and decoded, based on the first channel encoding and the polar encoding matrix, to obtain n information bit sequences.

According to the foregoing two implementations, optionally, a MIMO detector (detector) and a joint decoder (joint decoder) may be deployed at the receive end side. The MIMO detector is responsible for detecting the obtained to-be-decoded sequences, and the joint decoder is responsible for implementing the foregoing decoding process. For example, the n to-be-decoded sequences are decoded based on the first channel encoding and the polar encoding matrix. Alternatively, the n to-be-decoded sequences are decoded based on the first channel encoding and the submatrix of the polar encoding matrix. In addition, it should be noted that, the MIMO detector may also work together with the joint decoder. To be specific, they are not limited in any particular order, and it is not limited to perform decoding only after all the obtained to-be-decoded sequences are detected. Alternatively, detecting and decoding may be combined in a manner such as MMSE-SIC.

Optionally, for each of the n to-be-decoded sequences, better channel quality of MIMO layers corresponding to the to-be-decoded sequences indicates better reliability of polar channels corresponding to the to-be-decoded sequences. It should be noted that, the n to-be-decoded sequences herein are n to-be-decoded sequences detected through MIMO.

Further, with respect to the first channel encoding:

Optionally, the first channel encoding may take an encoding such as low density parity check (LDPC), parallel concatenated convolutional code (Turbo code), or BCH code (BCH). It should be noted that the transmit end and the receive end use a same scheme of the first channel encoding. The scheme may be negotiated or agreed by the transmit end and the receive end in advance, or the scheme may be a predefined and specified scheme.

Optionally, the transmit end may further send a parameter of the first channel encoding to the receive end. For example, the transmit end sends related messages to the receive end. The related messages may include a message about the parameter of the first channel encoding. Alternatively, the related messages include indication information indicating the parameter of the first channel encoding. The parameter of the first channel encoding may be used for decoding at the receive end side.

Optionally, the parameter of the first channel encoding includes at least one of the following: a length of each of the n information bit sequences, an encoding bit rate for performing the first channel encoding on each of the n information bit sequences, and an encoding length of performing the first channel encoding on each of the n information bit sequences. In addition, the parameter of the first channel encoding may further include another parameter that can represent the scheme of the first channel encoding. This is not limited in this embodiment of this application.

Further, with respect to the polar encoding matrix:

Optionally, the polar encoding matrix may represent a matrix having a size of $2^m \times 2^m$ where n is less than or equal to $2^m$, and m is a positive integer. Further, n may be set to be greater than $2^{m-1}$. For example, if n is not a positive integer to the power of 2, a value of m may meet the following condition: $n<2^m$, or $2^{m-1}<n<2^m$, or $m \geq \lceil \log_2 n \rceil$. If n is a positive integer to the power of 2, then $n=2^m$, or $m=\log_2 n$. In addition, optionally, in other words, the polar encoding matrix may alternatively represent a matrix having a size of $2^{\lceil \log_2 n \rceil} \times 2^{\lceil \log_2 n \rceil}$, where $\lceil \cdot \rceil$ represents a round-up operator.

Optionally, that the receive end obtains n information bit sequences after decoding may be implemented with reference to the following Manner 3 or Manner 4.

Manner 3: if n is equal to $2^m$, the receive end decodes the n to-be-decoded sequences based on the first channel encoding and the polar encoding matrix.

Manner 4: if n is less than $2^m$, the receive end decodes the n to-be-decoded sequences based on the first channel encoding and the submatrix of the polar encoding matrix, where the submatrix is a n×n matrix.

Optionally, in Manner 4, each row in the polar encoding matrix corresponds to one polar channel. If n is less than $2^m$, reliability of n polar channels corresponding to the submatrix is higher than reliability of remaining $2^m-n$ polar channels of $2^m$ polar channels.

According to the foregoing encoding and decoding method provided in this embodiment of this application, two-level encoding is used during encoding at the transmit end. First, independent outer coding is performed on different information bit sequences, and then a polarization operation (inner coding) continues to be performed on output of the outer coding, thereby improving encoding and decoding performance. In addition, after the polarization operation, corresponding bitstreams are adapted to MIMO layers having different SNR levels, so that transmission with a maximum channel capacity can be implemented as much as possible.

The following further describes in detail the encoding method and the decoding method provided in embodiments of this application with reference to Example 1 to Example 2. It should be noted that, the manners in the following Example 1 and Example 2 may be applied in combination with each other.

Example 1: $n=M_t=M_r$, where n is a positive integer to the power of 2.

Figure 8A:
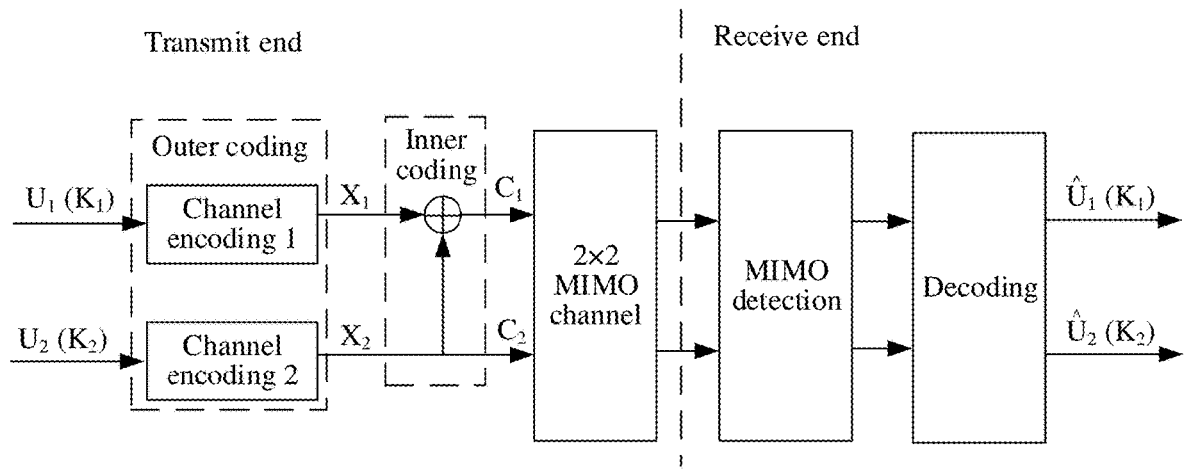
FIG. 8a is a first schematic diagram of an encoding and decoding procedure according to an embodiment of this application.

For example, when n is 2, refer to an encoding and decoding procedure shown in FIG. 8a. At the transmit end side, first channel encoding (an outer coding operation) is separately performed on 2 information bit sequences $U_1$ and $U_2$, whose lengths are respectively $K_1$ and $K_2$. After the encoding, corresponding channel encoders each output a first encoded sequence whose length is N bits. As shown, a channel encoder 1 outputs a first encoded sequence $X_1$, and a channel encoder 2 outputs a first encoded sequence $X_2$. Both $X_1$ and $X_2$ are N bits in length. An inner coding operation is performed on $X_1$, $X_2$, to obtain 2 second encoded sequences, that is, $C_1$ and $C_2$, where $C_1=X_1 \oplus X_2$, and $C_2=X_2$.

FIG. 8a shows an inner coding operation, that is, a scheme in Manner 1 in S703. In an inner coding operation, the transmit end generates 2 second encoded sequences based on a polar encoding matrix of 2×2 and the 2 first encoded sequences. The process may also be represented as:

$$x_1^2 = u_1^2 G_2 = u_1^2 F_2 = \begin{bmatrix} X_1 \\ X_2 \end{bmatrix}^T \begin{bmatrix} 1 & 0 \\ 1 & 1 \end{bmatrix} = \begin{bmatrix} C_1 \\ C_2 \end{bmatrix}.$$

In addition, it should be noted that, the inner coding operation shown in FIG. 8a may also be equivalently understood as N polar code encoding operations with an encoding length of 2 and a bit rate of 1.

Then, the transmit end sends $C_1$ and $C_2$ to the 2×2 MIMO channel for transmission. At the receive end, the 2 second encoded sequences are detected by the MIMO detector, and then coded (or referred to as decoded) by the joint decoder, to obtain information bit sequences $\hat{U}_1$ and $\hat{U}_2$.

Figure 8B:
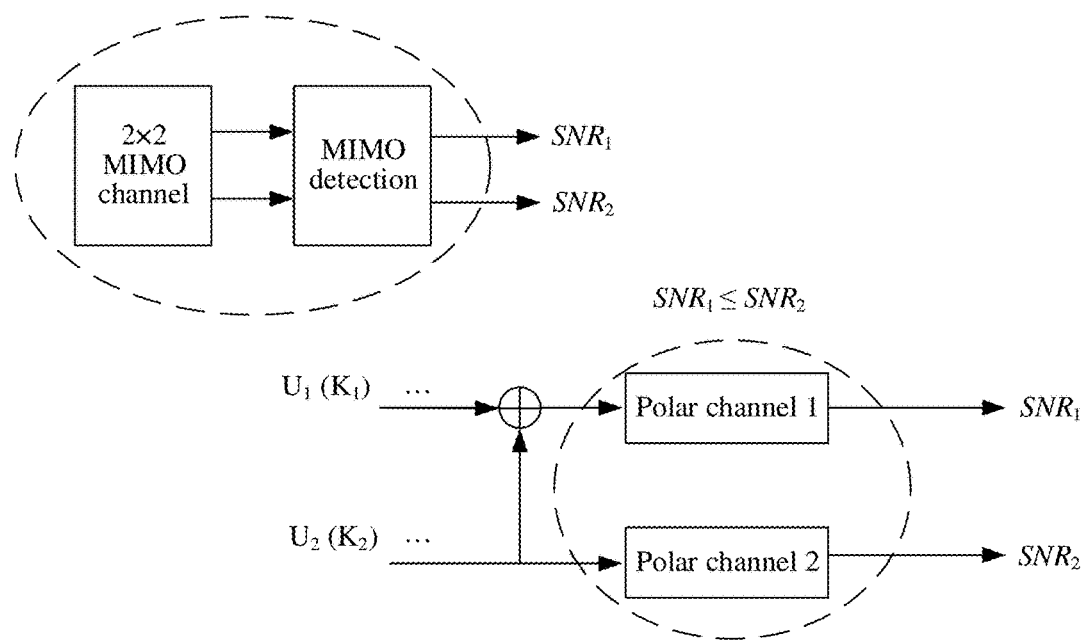
FIG. 8b is a first schematic diagram of polarization at different MIMO layers according to an embodiment of this application.

Further, optionally, if previously for bitstreams obtained after MIMO detection at the receive end side, SNRs of MIMO layers corresponding to different bitstreams are different. The receive end may feed back different SNRs to the transmit end, and then the transmit end may follow the following rule when sending the plurality of second encoded sequences (for example, $C_1$ and $C_2$) to the MIMO channel. To be specific, a polar channel with low reliability corresponds to a MIMO layer with a low SNR, and a polar channel with high reliability corresponds to a channel layer with a high SNR. Refer to FIG. 8b. FIG. 8b is a schematic diagram of polarization at different MIMO layers. It is assumed that in a 2×2 MIMO channel, the SNRs of all MIMO layers are determined through MIMO detection at the receive end as follows: $SNR_1 \leq SNR_2$. Reliability of the polar channel corresponding to $C_1 \leq$ reliability of the polar channel corresponding to $C_2$. The values of $K_1$ and $K_2$ may be set with reference to the relationship between $SNR_1$, $SNR_2$, for example, set as $K_1 \leq K_2$.

Figure 9A:
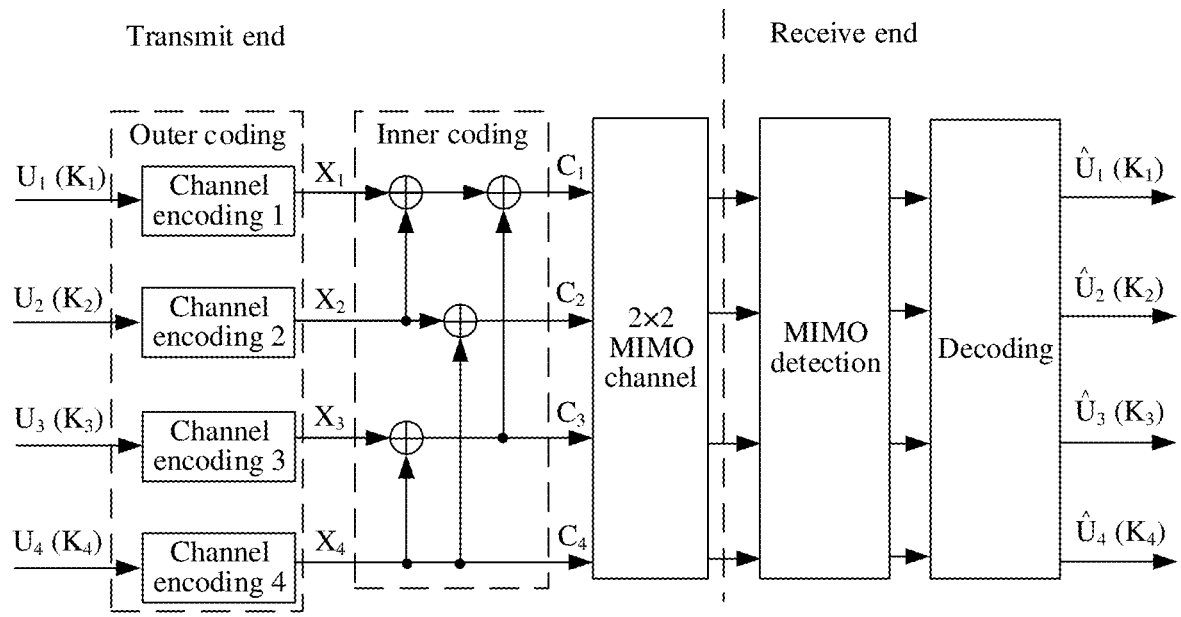
FIG. 9a is a second schematic diagram of an encoding and decoding procedure according to an embodiment of this application.

For example, when n is 4, refer to an encoding and decoding procedure shown in FIG. 9a. At the transmit end side, first channel encoding (an outer coding operation) is separately performed on 4 information bit sequences $U_1$, $U_2$, $U_3$, $U_4$, whose lengths are respectively $K_1$, $K_2$, $K_3$, $K_4$. After the encoding, corresponding channel encoders each output a first encoded sequence whose length is N bits. As shown in FIG. 9a, a channel encoder 1 outputs a first encoded sequence $X_1$, a channel encoder 2 outputs a first encoded sequence $X_2$, a channel encoder 3 outputs a first encoded sequence $X_3$, and a channel encoder 4 outputs a first encoded sequence $X_4$. $X_1$, $X_2$, $X_3$, $X_4$ are N bits in length. An inner coding operation is performed on $X_1$, $X_2$, $X_3$, $X_4$, to obtain 4 second encoded sequences, that is, $C_1$, $C_2$, $C_3$, $C_4$, where $C_1=X_1+X_2+X_3+X_4$ $C_2=X_2+X_4$ $C_3=X_3+X_4$ $C_4=X_4$.

FIG. 9a shows an inner coding operation, that is, a scheme in Manner 1 in S703. In an inner coding operation, the transmit end generates 4 second encoded sequences based on a polar encoding matrix of 4×4 and the 4 first encoded sequences. The process may also be represented as.

$$x_1^4 = u_1^4 G_4 = u_1^4 F_2^{\otimes (\log_2(4))} = \begin{bmatrix} X_1 \\ X_2 \\ X_3 \\ X_4 \end{bmatrix}^T \begin{bmatrix} 1 & 0 & 0 & 0 \\ 1 & 1 & 0 & 0 \\ 1 & 0 & 1 & 0 \\ 1 & 1 & 1 & 1 \end{bmatrix} = \begin{bmatrix} C_1 \\ C_2 \\ C_3 \\ C_4 \end{bmatrix}.$$

In addition, it should be noted that, the inner coding operation shown in FIG. 9a may also be equivalently understood as N polar code encoding operations with an encoding length of 4 and a bit rate of 1.

Then, the transmit end sends $C_1$, $C_2$, $C_3$, $C_4$ to the 4×4 MIMO channel for transmission. At the receive end, the 4 second encoded sequences are detected by the MIMO detector, and then coded (or referred to as decoded) by the joint decoder, to obtain 4 information bit sequences, represented as $\hat{U}_1$, $\hat{U}_2$, $\hat{U}_3$, $\hat{U}_4$.

Optionally, the foregoing MIMO detector may use a multi-user detector such as an MMSE detector, an MMSE-SIC detector, a ZF detector, or a vertical bell laboratories layered space-time (V-BLAST) detector. For example, when the MMSE detector is used, received bitstreams needs to be detected first, to obtain detected soft information of the plurality of bitstreams. The information is sent to the joint decoder for decoding. It should be noted that, when the MMSE-SIC detector is used, transmission with a channel capacity can be implemented for a MIMO system.

Figure 9B:
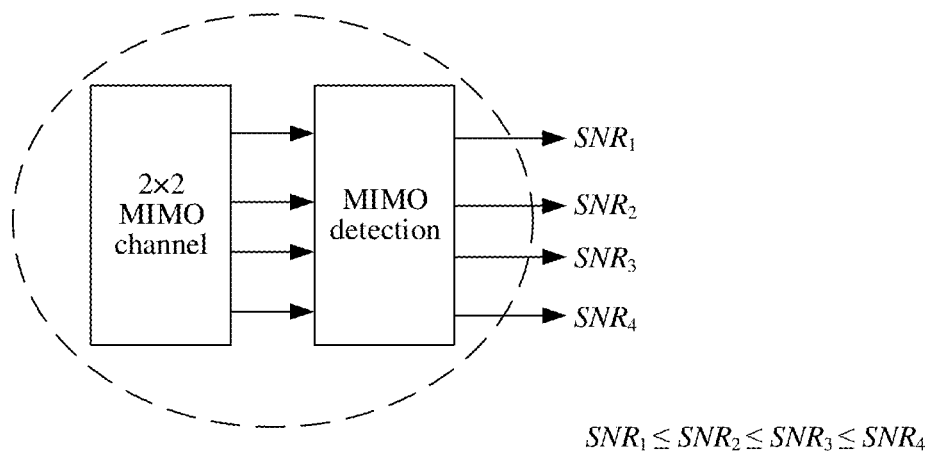
FIG. 9b is a second schematic diagram of polarization at different MIMO layers according to an embodiment of this application.
Figure 9B:
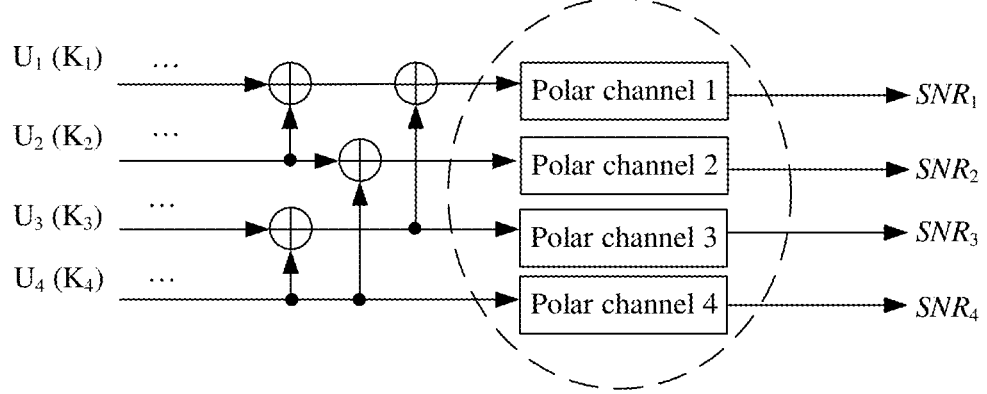

Further, optionally, if previously for bitstreams obtained after MIMO detection at the receive end side, SNRs of MIMO layers corresponding to different bitstreams are different. The receive end may feed back different SNRs to the transmit end, and then the transmit end may follow the following rule when sending the plurality of second encoded sequences (for example, $C_1$, $C_2$, $C_3$, $C_4$) to the MIMO channel. To be specific, a channel layer with low polar channel reliability corresponds to a MIMO layer with a low SNR, and a channel layer with high polar channel reliability corresponds to a channel layer with a high SNR. Refer to FIG. 9b. FIG. 9b is another schematic diagram of polarization at different MIMO layers. It is assumed that in a 4×4 MIMO channel scenario, that $SNR_1 \leq SNR_2 \leq SNR_1 \leq SNR_2$ is determined for MIMO layers through MIMO detection at the receive end. Reliability of the polar channel corresponding to $C_1 \leq$ reliability of the polar channel corresponding to $C_2 \leq$ reliability of the polar channel corresponding to $C_3 \leq$ reliability of the polar channel corresponding to $C_4$.

Optionally, the values of the foregoing $K_1$, $K_2$, $K_3$, $K_4$ may be set with reference to the relationship between $SNR_1$, $SNR_2$, $SNR_3$, $SNR_4$, for example, set as $K_1 \leq K_2 \leq K_3 \leq K_4$. Compared with a channel encoding scheme in a conventional MIMO technology, bit rates of bitstreams can be adapted to SNRs of all MIMO layers, thereby further improving system performance.

Example 2: $n=M_t=M_r$, where n is not a power of 2.

Figure 10:
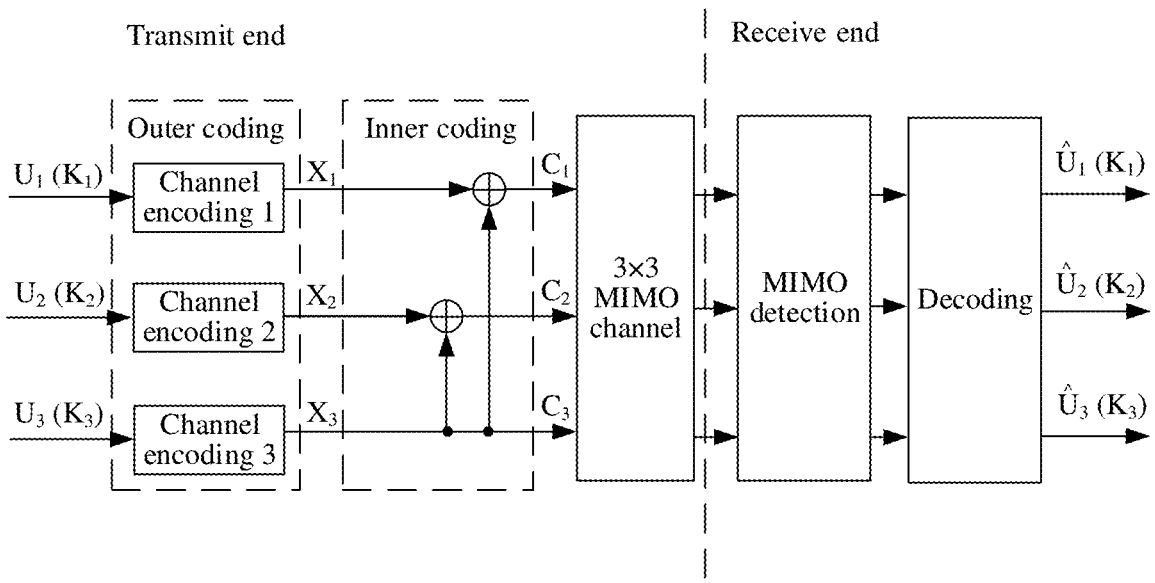
FIG. 10 is a third schematic diagram of polarization at different MIMO layers according to an embodiment of this application.

For example, when n is 3, refer to an encoding and decoding procedure shown in FIG. 10. At the transmit end side, first channel encoding (an outer coding operation) is separately performed on 3 information bit sequences $U_1$, $U_2$, $U_3$, whose lengths are respectively $K_1$, $K_2$, $K_3$. After the encoding, corresponding channel encoders each output a first encoded sequence whose length is N bits. As shown in FIG. 9a, a channel encoder 1 outputs a first encoded sequence $X_1$, a channel encoder 2 outputs a first encoded sequence $X_2$, and a channel encoder 3 outputs a first encoded sequence $X_3$. $X_1$, $X_2$, $X_3$ are N bits in length. An inner coding operation is performed on $X_1$, $X_2$, $X_3$, to obtain 3 second encoded sequences, that is, $C_1$, $C_2$, $C_3$.

Optionally, for a 3×3 MIMO channel scenario, in this embodiment of this application, a polar encoding matrix having a size of 4×4 is selected for transformation. It is assumed to sort polar channels by their reliabilities. Reliability of a polar channel corresponding to a first row in the 4×4 polar encoding matrix is the worst. In this case, elements in a first row and a first column in the 4×4 polar encoding matrix shown in FIG. 10 (that is, elements marked in dashed lines in FIG. 10) may be deleted, and the remaining elements form a submatrix having a size of 3×3 of the 4×4 polar encoding matrix. The transmit end may specifically perform a bit block-based polar encoding operation based on the 3×3 submatrix in the inner coding operation. The parameters involved are as follows:

$C_1 = X_1 + X_3$ $C_2 = X_2 + X_3$ $C_3 = X_3$.

FIG. 10 shows an inner coding operation, that is, a scheme in Manner 1 in S703. In an inner coding operation, the transmit end generates 3 second encoded sequences based on the submatrix (3×3) of the 4×4 polar encoding matrix and the 3 first encoded sequences. The process may also be represented as:

$$x_1^4 = u_1^4 G_4 = u_1^4 F' = \begin{bmatrix} X_1 \\ X_2 \\ X_3 \end{bmatrix}^T \begin{bmatrix} 1 & 0 & 0 \\ 0 & 1 & 0 \\ 1 & 1 & 1 \end{bmatrix} = \begin{bmatrix} C_1 \\ C_2 \\ C_3 \end{bmatrix}.$$

F' represents transformation of $F_2^{\otimes(\log_2(4))}$, and is a submatrix of $F_2^{\otimes(\log_2(4))}$. In addition, it should be noted that, the inner coding operation shown in FIG. 10 may also be equivalently understood as N polar code encoding operations with an encoding length of 3 and a bit rate of 1.

Then, the transmit end sends $C_1$, $C_2$, $C_3$ to the MIMO channel of 3×3 for transmission. At the receive end, the 3 second encoded sequences are detected by the MIMO detector, and then coded (or referred to as decoded) by the joint decoder, to obtain 3 information bit sequences, represented as $\hat{U}_1$, $\hat{U}_2$, $\hat{U}_3$.

Optionally, the foregoing MIMO detector may use a multi-user detector such as an MMSE detector, an MMSE-SIC detector, a ZF detector, or a V-BLAST detector. For example, when the MMSE detector is used, received bitstreams needs to be detected first, to obtain detected soft information of the plurality of bitstreams. The information is sent to the joint decoder for decoding. It should be noted that, when the MMSE-SIC detector is used, transmission with a channel capacity can be implemented for a MIMO system.

Further, optionally, if previously for bitstreams obtained after MIMO detection at the receive end side, SNRs of MIMO layers corresponding to different bitstreams are different. The receive end may feed back different SNRs to the transmit end, and then the transmit end may follow the following rule when sending the plurality of second encoded sequences (for example, $C_1$, $C_2$, $C_3$) to the MIMO channel. To be specific, a channel layer with low polar channel reliability corresponds to a MIMO layer with a low SNR, and a channel layer with high polar channel reliability corresponds to a channel layer with a high SNR. Refer to FIG. 8b. FIG. 8b is a schematic diagram of polarization at different MIMO layers. For details, refer to the implementations described in FIG. 8b/FIG. 9b. Details are not described in this embodiment of this application again.

In this embodiment of this application, a quantity of bitstreams input through inner coding is not limited to a power of 2. Instead, a corresponding polar encoding matrix is transformed based on polar channel reliability, so that adaptable scenarios can be extended and more flexible channel encoding can be implemented.

Figure 11:
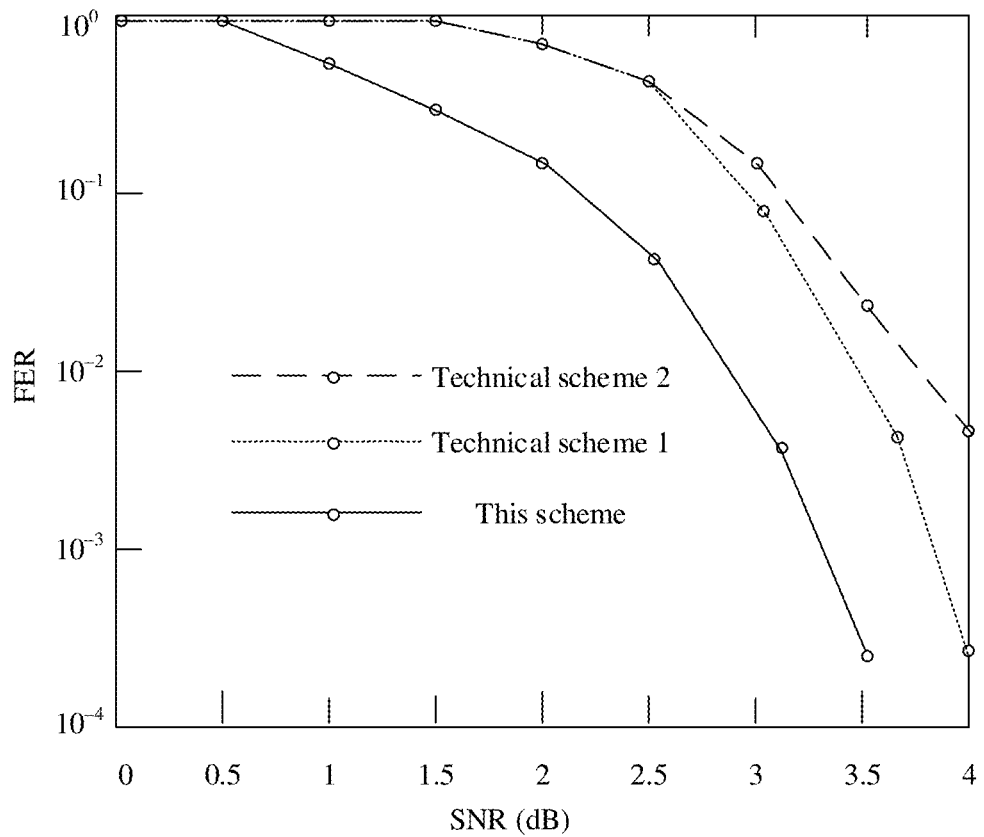
FIG. 11 is a schematic diagram of comparison between frame error rates according to an embodiment of this application.

In addition, referring to FIG. 11, an embodiment of this application further provides a schematic diagram of comparison between frame error rates. It is shown that compared with the encoding scheme of the conventional MIMO system (for example, the foregoing technical scheme 1 and technical scheme 2), the foregoing two-level encoding method (the outer coding operation, that is the first channel encoding; and the inner coding operation, that is the polar encoding) according to embodiments of this application applied to the MIMO system can improve encoding and decoding performance, bring a better performance gain, and reduce a corresponding frame error rate (FER).

Figure 12:
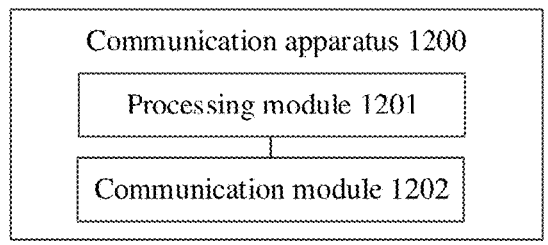
FIG. 12 is a first schematic diagram of a structure of a communication apparatus according to an embodiment of this application.

Based on the same concept, referring to FIG. 12, an embodiment of this application provides a communication apparatus 1200. The apparatus 1200 includes a processing module 1201 and a communication module 1202. The communication apparatus 1200 may be a transmit end, or may be an apparatus used in the transmit end and capable of supporting the transmit end in performing an encoding method. Alternatively, the communication apparatus 1200 may be a receive end, or may be an apparatus used in the receive end and capable of supporting the receive end in performing a decoding method.

The communication module may also be referred to as a transceiver module, a transceiver, a transceiver apparatus, or the like. The processing module may also be referred to as a processor, a processing board, a processing unit, a processing apparatus, or the like. Optionally, a component that is in the communication module and that is configured to implement the receiving function may be considered as a receiving unit. It should be understood that the communication module is configured to perform a sending operation and a receiving operation at the transmit end side or the receive end side in the foregoing method embodiment. A component that is in the communication module and that is configured to implement the sending function is considered as a sending unit. That is, the communication module includes a receiving unit and a sending unit. When the apparatus 1200 is used at the transmit end, a receiving unit included in the communication module 1202 of the apparatus 1200 is configured to perform a receiving operation at the transmit end side, for example, receive channel quality of n MIMO layers from the receive end. The sending unit included in the communication module 1202 of the apparatus 1200 is configured to perform a sending operation at the transmit end side, for example, send a parameter of the first channel encoding to the receive end. When the apparatus 1200 is used at the receive end, a receiving unit included in the communication module 1202 of the apparatus 1200 is configured to perform a receiving operation at the receive end side, for example, receive a parameter of the first channel encoding from the transmit end. The sending unit included in the communication module 1202 of the apparatus 1200 is configured to perform a sending operation at the receive end side, for example, send channel quality of n MIMO layers to the transmit end. In addition, it should be noted that, if the apparatus is implemented by using a chip/chip circuit, the communication module 1202 may be an input/output circuit and/or a communication interface, and performs an input operation (corresponding to the foregoing receiving operation) and an output operation (corresponding to the foregoing sending operation). The processing module 1201 is an integrated processor, a microprocessor, or an integrated circuit.

The following describes in detail an implementation in which the apparatus 1200 is used at the transmit end. The apparatus 1200 includes the processing module 1201 and the communication module 1202.

The processing module 1201 is configured to obtain n information bit sequences, and perform first channel encoding on the n information bit sequences to obtain n first encoded sequences, where the n first encoded sequences have a same length, n is a quantity of antenna ports, and n is a positive integer greater than 1. The processing module 1201 is further configured to generate n second encoded sequences based on a polar encoding matrix and the n first encoded sequences. The communication module 1202 is configured to output the n second encoded sequences.

In a two-level encoding scheme, independent first channel encoding is first performed on different information bit sequences, and then a polarization operation is performed on a plurality of encoded sequences obtained after the first channel encoding, thereby improving encoding performance.

In an optional implementation, the first channel encoding may take an encoding such as low density parity check (LDPC), parallel concatenated convolutional code (Turbo code), or BCH code (BCH).

In an optional implementation, the polar encoding matrix is a $2^m \times 2^m$ matrix, and n is less than or equal to $2^m$, and m is a positive integer. Optionally, a value of m may meet the following condition: $2^{m-1} \leq n \leq 2^m$.

In an optional implementation, the processing module 1201 is further configured to: if n is equal to $2^m$, perform bit block-based polar encoding on the n first encoded sequences based on the polar encoding matrix, to generate the n second encoded sequences; or if n is less than $2^m$, generate the n second encoded sequences based on a submatrix of the polar encoding matrix and the n first encoded sequences, where the submatrix is a n×n matrix.

In this embodiment of this application, a quantity of sequences for performing bit block-based polar encoding is not limited to that n is a power of 2, so that adaptable scenarios can be extended and more flexible channel encoding can be implemented.

In an optional implementation, each row in the polar encoding matrix corresponds to one polar channel; and if n is less than $2^m$, reliability of n polar channels corresponding to the submatrix is higher than reliability of remaining $2^m-n$ polar channels of $2^m$ polar channels. A corresponding polar encoding matrix is transformed based on polar channel reliability, and a polar channel with relatively high reliability is retained, which helps improve encoding performance.

In an optional implementation, better channel quality of multiple input multiple output MIMO layers corresponding to the second encoded sequences indicates better reliability of polar channels corresponding to the second encoded sequences. After the polarization operation, corresponding bitstreams are adapted to MIMO layers having different channel quality levels, so that transmission with a maximum channel capacity can be implemented as much as possible.

In an optional implementation, the processing module 1201 is further configured to: before the n information bit sequences are obtained, obtain, by using the communication module 1202, channel quality corresponding to n MIMO layers.

In an optional implementation, the communication module 1202 is further configured to send a parameter of the first channel encoding. The parameter of the first channel encoding may be used for decoding at the receive end side, which helps improve decoding efficiency at the receive end side.

In an optional implementation, the parameter of the first channel encoding includes at least one of the following: a length of the first encoded sequence, a length of each of the n information bit sequences, and an encoding bit rate for performing the first channel encoding on each of the n information bit sequences.

The following describes in detail an implementation in which the apparatus 1200 is used at the receive end. The apparatus 1200 includes the communication module 1202 and the processing module 1201.

The communication module 1202 is configured to obtain n to-be-decoded sequences, where the n to-be-decoded sequences have a same length, n is a quantity of antenna ports, and n is a positive integer greater than 1. The processing module 1201 is configured to decode the n to-be-decoded sequences based on first channel encoding and a polar encoding matrix, to obtain n information bit sequences. Correspondingly encoding device, configured to perform the two-level encoding scheme at the transmit end side, and corresponding decoding device, configured to perform decoding in reverse based on the first channel encoding and the polar encoding matrix at the receive end side, help improve decoding performance.

In an optional implementation, the first channel encoding may take an encoding such as low density parity check (LDPC), parallel concatenated convolutional code (Turbo code), or BCH code (BCH).

In an optional implementation, the polar encoding matrix is a $2^m \times 2^m$ matrix, and n is less than or equal to $2^m$, and m is a positive integer. Optionally, a value of m may meet the following condition: $2^{m-1} \leq n \leq 2^m$.

In an optional implementation, the processing module 1201 is further configured to: if n is equal to $2^m$, decode the n to-be-decoded sequences based on the first channel encoding and the polar encoding matrix; or if n is less than $2^m$, decode the n to-be-decoded sequences based on the first channel encoding and a submatrix of the polar encoding matrix, where the submatrix is a n×n matrix.

In this embodiment of this application, a quantity of to-be-decoded sequences is not limited to that n is a power of 2, so that adaptable scenarios can be extended and more flexible channel decoding can be implemented.

In an optional implementation, each row in the polar encoding matrix corresponds to one polar channel; and if n is less than $2^m$, reliability of n polar channels corresponding to the submatrix is higher than reliability of remaining $2^m - n$ polar channels of $2^m$ polar channels.

In an optional implementation, better channel quality of multiple input multiple output MIMO layers corresponding to the to-be-decoded sequences indicates better reliability of polar channels corresponding to the to-be-decoded sequences.

In an optional implementation, the communication module 1202 is further configured to obtain a parameter of the first channel encoding. This helps improve decoding efficiency at the receive end side.

In an optional implementation, the parameter of the first channel encoding includes at least one of the following: a length of each of the n information bit sequences, an encoding bit rate for performing the first channel encoding on each of the n information bit sequences, and an encoding length of performing the first channel encoding on each of the n information bit sequences.

Figure 13:
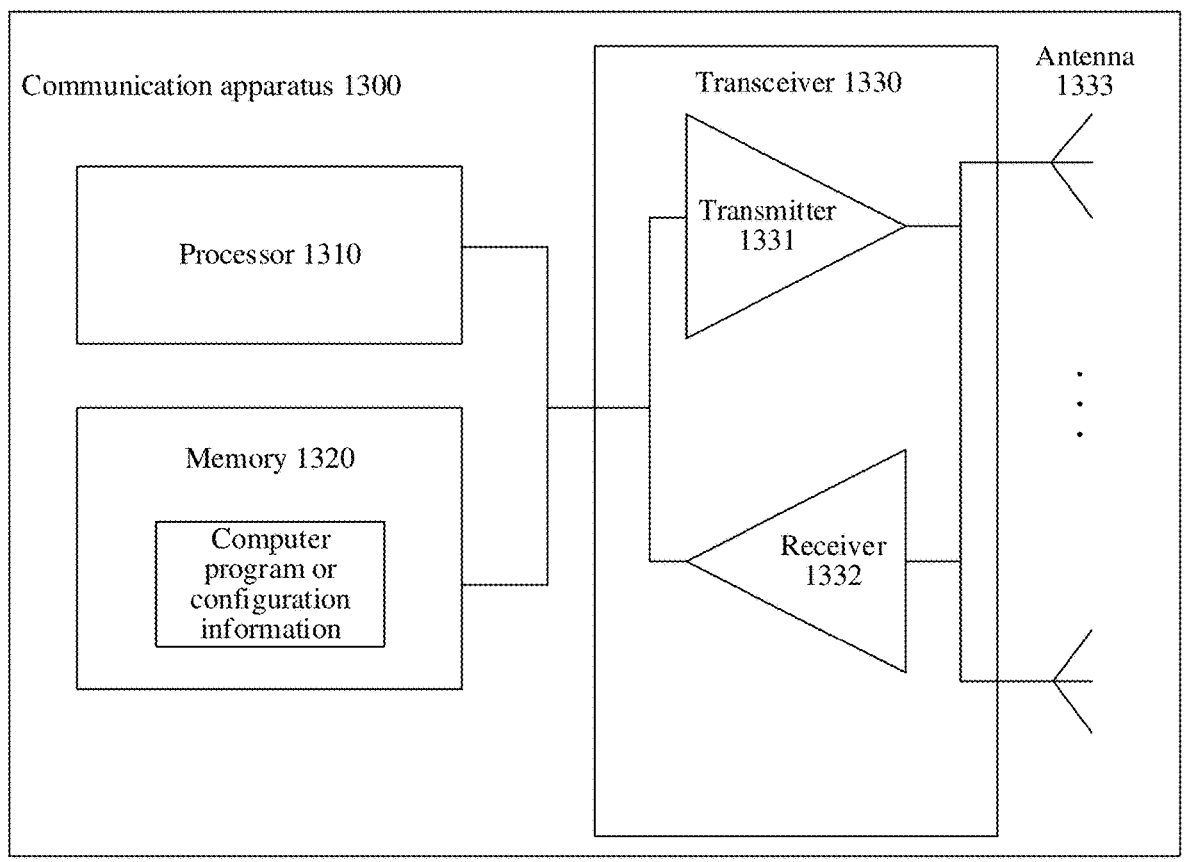
FIG. 13 is a second schematic diagram of a structure of a communication apparatus according to an embodiment of this application.

Based on the same concept, as shown in FIG. 13, an embodiment of this application provides a communication apparatus 1300. The communication apparatus 1300 may be a chip or a chip system. Optionally, in this embodiment of this application, the chip system may include a chip, or may include a chip and another discrete component.

The communication apparatus 1300 may include at least one processor 1310. The processor 1310 is coupled to a memory. Optionally, the memory may be located in the apparatus, the memory may be integrated with the processor, or the memory may be located outside the apparatus. For example, the communication apparatus 1300 may further include at least one memory 1320. The memory 1320 stores a computer program, configuration information, a computer program or instructions, and/or data necessary for implementing any one of the foregoing embodiments. The processor 1310 may execute the computer program stored in the memory 1320, to complete the method in any one of the foregoing embodiments.

The coupling in this embodiment of this application may be an indirect coupling or a communication connection between apparatuses, units, or modules in an electrical form, a mechanical form, or another form, and is used for information exchange between the apparatuses, the units, or the modules. The processor 1310 may cooperate with the memory 1320. A specific connection medium between a transceiver 1330, the processor 1310, and the memory 1320 is not limited in this embodiment of this application.

The communication apparatus 1300 may further include the transceiver 1330, and the communication apparatus 1300 may exchange information with another device through the transceiver 1330. The transceiver 1330 may be a circuit, a bus, a transceiver, or any other apparatus that may be configured to exchange information, or is referred to as a signal sending and receiving unit. As shown in FIG. 13, the transceiver 1330 includes a transmitter 1331, a receiver 1332, and an antenna 1333. In addition, when the communication apparatus 1300 is a chip type apparatus or a circuit, the transceiver in the apparatus 1300 may alternatively be an input/output circuit and/or a communication interface, and may input data (or is referred to as receiving data) and output data (or is referred to as sending data). The processor is an integrated processor, a microprocessor, or an integrated circuit, and the processor may determine output data based on input data.

In a possible implementation, the communication apparatus 1300 may be used at the transmit end. Specifically, the communication apparatus 1300 may be the transmit end, or may be an apparatus that can support the transmit end and implement a function of the transmit end in any one of the foregoing embodiments. The memory 1320 stores a computer program, a computer program or instructions, and/or data necessary for implementing a function of the transmit end in any one of the foregoing embodiments. The processor 1310 may execute the computer program stored in the memory 1320, to complete the method performed by the transmit end in any one of the foregoing embodiments. When used at the transmit end, the transmitter 1331 in the communication apparatus 1300 may be configured to send transmission control configuration information to the receive end through the antenna 1333, and the receiver 1332 may be configured to receive, through the antenna 1333, transmission information sent by the receive end.

In another possible implementation, the communication apparatus 1300 may be used at the receive end. Specifically, the communication apparatus 1300 may be the receive end, or may be an apparatus that can support the receive end and implement a function of the receive end in any one of the foregoing embodiments. The memory 1320 stores a computer program, a computer program or instructions, and/or data necessary for implementing a function of the receive end in any one of the foregoing embodiments. The processor 1310 may execute the computer program stored in the memory 1320, to complete the method performed by the receive end in any one of the foregoing embodiments. When used at the receive end, the receiver 1332 in the communication apparatus 1300 may be configured to receive, through the antenna 1333, transmission control configuration information sent by the transmit end, and the transmitter 1331 may be configured to send transmission information to the transmit end through the antenna 1333.

The communication apparatus 1300 provided in this embodiment may be used at the transmit end to complete the foregoing method performed by the transmit end, or may be used at the receive end to complete the method performed by the receive end. Therefore, for a technical effect that can be achieved, refer to the foregoing method embodiment. Details are not described herein again.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the methods disclosed with reference to embodiments of this application may be directly implemented by a hardware processor, or may be implemented by using a combination of hardware in a processor and a software module.

In embodiments of this application, the memory may be a nonvolatile memory, a hard disk drive (HDD) or a solid-state drive (SSD), or may be a volatile memory (volatile memory), for example, a random-access memory (RAM). Alternatively, the memory may be any other medium that can be configured to carry or store desired program code in a form of an instruction or a data structure and that can be accessed by a computer, but is not limited thereto. Alternatively, the memory in this embodiment of this application may be a circuit or any other apparatus that can implement a storage function, and is configured to store a computer program, a computer program or instructions, and/or data.

Figure 14:
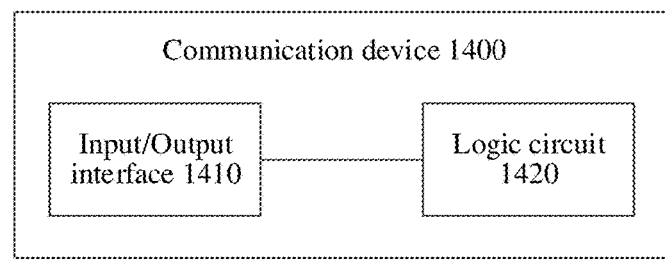
FIG. 14 is a third schematic diagram of a structure of a communication apparatus according to an embodiment of this application.

Based on the foregoing embodiments, referring to FIG. 14, an embodiment of this application further provides another communication apparatus 1400, including: an input/output interface 1410 and a logic circuit 1420, where the input/output interface 1410 is configured to receive code instructions and transmit the code instructions to the logic circuit 1420; and the logic circuit 1420 is configured to run code instructions to perform the method performed by the transmit end or the method performed by the receive end in any one of the foregoing embodiments.

The communication apparatus 1400 may be used at the transmit end to perform the method performed by the transmit end. The logic circuit 1420 is configured to obtain n information bit sequences; perform first channel encoding on the n information bit sequences to obtain n first encoded sequences, where the n first encoded sequences have a same length, n is a quantity of antenna ports, and n is a positive integer greater than 1; and generate n second encoded sequences based on a polar encoding matrix and the n first encoded sequences. The input/output interface 1410 is configured to output the n second encoded sequences.

The communication apparatus 1400 may be used at the receive end to perform the method performed by the receive end. In an optional implementation, the input/output interface 1410 is configured to obtain n to-be-decoded sequences, where the n to-be-decoded sequences have a same length, n is a quantity of antenna ports, and n is a positive integer greater than 1. The logic circuit 1420 is configured to decode the n to-be-decoded sequences based on first channel encoding and a polar encoding matrix, to obtain n information bit sequences.

The communication apparatus 1400 provided in this embodiment may be used at the transmit end to perform the foregoing method performed by the transmit end, or may be used at the receive end to perform the method performed by the receive end. Therefore, for a technical effect that can be achieved, refer to the foregoing method embodiment. Details are not described herein again.

Based on the foregoing embodiments, an embodiment of this application further provides a communication system. The communication system includes at least one communication apparatus used at the transmit end and at least one communication apparatus used at the receive end. For a technical effect that can be achieved, refer to the foregoing method embodiment. Details are not described herein again.

Based on the foregoing embodiments, an embodiment of this application further provides a computer-readable storage medium. The computer-readable storage medium stores a computer program or instructions, and when the instructions are run, the method performed by the transmit end in any one of the foregoing embodiments is implemented or the method performed by the receive end in any one of the foregoing embodiments is implemented. The computer-readable storage medium may include: any medium that can store program code, such as a USB flash drive, a removable hard disk, a read-only memory, a random access memory, a magnetic disk, or an optical disc.

To implement functions of the communication apparatuses in FIG. 13 to FIG. 14, an embodiment of this application further provides a chip, including a processor, configured to support the communication apparatus in implementing functions of the transmit end or the receive end in the foregoing method embodiments. In a possible design, the chip is connected to a memory, or the chip includes a memory. The memory is configured to store a computer program or instructions and data that are necessary for the communication apparatus.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that each procedure and/or block in the flowcharts and/or block diagrams, and combinations of the procedures and/or blocks in the flowcharts and/or block diagrams may be implemented by the computer program or instructions. The computer program or instructions may be provided to a processor of a general-purpose computer, a special-purpose computer, an embedded processor, or another programmable data processing device to generate a machine, such that the instructions executed by the processor of the computer or another programmable data processing device generate an apparatus for implementing a specific function in one or more procedures in the flowcharts and/or one or more blocks in the block diagrams.

The computer program or instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program or instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the scope of embodiments of this application. In this way, this application is intended to cover these modifications and variations of embodiments of this application provided that they fall within the scope of protection defined by the following claims and their equivalent technologies.

What is claimed is:

1. An encoding method, comprising:
   obtaining n information bit sequences, wherein n is a quantity of antenna ports, and n is a positive integer greater than 1;
   performing first channel encoding on the n information bit sequences to obtain n first encoded sequences, wherein the n first encoded sequences have a same length;
   generating n second encoded sequences based on a polar encoding matrix and the n first encoded sequences; and
   outputting the n second encoded sequences.

2. The method according to claim 1, wherein the polar encoding matrix is a $2^m \times 2^m$ matrix, wherein n is less than or equal to $2^m$, and m is a positive integer.

3. The method according to claim 2, wherein the generating the n second encoded sequences comprises:
   in response to n equal to $2^m$, performing bit block-based polar encoding on the n first encoded sequences based on the polar encoding matrix, to generate the n second encoded sequences; and
   in response to n less than $2^m$, generating the n second encoded sequences based on a submatrix of the polar encoding matrix and the n first encoded sequences, wherein the submatrix is an n×n matrix.

4. The method according to claim 3, wherein
   each row in the polar encoding matrix corresponds to one polar channel; and
   in response to n less than $2^m$, reliability of n polar channels corresponding to the submatrix is higher than reliability of remaining ($2^m$–n) polar channels of $2^m$ polar channels.

5. The method according to claim 4, wherein
   better channel quality of multiple input multiple output (MIMO) layers corresponding to the n second encoded sequences indicates higher reliability of polar channels corresponding to the n second encoded sequences.

6. The method according to claim 1, wherein the method further comprises:
   sending a parameter of the first channel encoding.

7. The method according to claim 6, wherein
   the parameter of the first channel encoding comprises at least one of:
   the length of the n first encoded sequences,
   a length of each of the n information bit sequences, or
   an encoding bit rate for said performing the first channel encoding on each of the n information bit sequences.

8. A communication apparatus, comprising: a logic circuit and an input/output interface, wherein
   the logic circuit is configured to
      obtain n information bit sequences;
      perform first channel encoding on the n information bit sequences to obtain n first encoded sequences, wherein the n first encoded sequences have a same length, n is a quantity of antenna ports, and n is a positive integer greater than 1; and
      generate n second encoded sequences based on a polar encoding matrix and the n first encoded sequences; and
   the input/output interface is configured to
      output the n second encoded sequences.

9. The apparatus according to claim 8, wherein the polar encoding matrix is a $2^m \times 2^m$ matrix, wherein n is less than or equal to $2^m$, and m is a positive integer.

10. The apparatus according to claim 9, wherein
    the logic circuit is configured to generate the n second encoded sequences by:
    in response to n equal to $2^m$, performing bit block-based polar encoding on the n first encoded sequences based on the polar encoding matrix, to generate the n second encoded sequences; and
    in response to n less than $2^m$, generating the n second encoded sequences based on a submatrix of the polar encoding matrix and the n first encoded sequences, wherein the submatrix is an n×n matrix.

11. The apparatus according to claim 10, wherein
    each row in the polar encoding matrix corresponds to one polar channel; and
    in response to n less than $2^m$, reliability of n polar channels corresponding to the submatrix is higher than reliability of remaining ($2^m$–n) polar channels of $2^m$ polar channels.

12. The apparatus according to claim 11, wherein
    better channel quality of multiple input multiple output (MIMO) layers corresponding to the n second encoded sequences indicates higher reliability of polar channels corresponding to the n second encoded sequences.

13. The apparatus according to claim 8, wherein the input/output interface is further configured to:
    send a parameter of the first channel encoding.

14. The apparatus according to claim 13, wherein
    the parameter of the first channel encoding comprises at least one of:
    the length of the n first encoded sequences,
    a length of each of the n information bit sequences, or
    an encoding bit rate for performing the first channel encoding on each of the n information bit sequences.

15. A non-transitory computer-readable storage medium, wherein the computer-readable storage medium stores a computer program or instructions which, when run on an apparatus, cause the apparatus to:
    obtain n information bit sequences;
    perform first channel encoding on the n information bit sequences to obtain n first encoded sequences, wherein the n first encoded sequences have a same length, n is a quantity of antenna ports, and n is a positive integer greater than 1;
    generate n second encoded sequences based on a polar encoding matrix and the n first encoded sequences; and
    output the n second encoded sequences.

16. The non-transitory computer-readable storage medium according to claim 15, wherein the polar encoding matrix is a $2^m \times 2^m$ matrix, wherein n is less than or equal to $2^m$, and m is a positive integer.

17. The non-transitory computer-readable storage medium according to claim 16, wherein
    the apparatus is caused to generate the n second encoded sequences by:
    in response to n equal to $2^m$, performing bit block-based polar encoding on the n first encoded sequences based on the polar encoding matrix, to generate the n second encoded sequences; and
    in response to n less than $2^m$, generating the n second encoded sequences based on a submatrix of the polar encoding matrix and the n first encoded sequences, wherein the submatrix is an n×n matrix.

18. The non-transitory computer-readable storage medium according to claim 17, wherein
    each row in the polar encoding matrix corresponds to one polar channel; and in response to n less than $2^m$, reliability of n polar channels corresponding to the submatrix is higher than reliability of remaining ($2^m$–n) polar channels of $2^m$ polar channels.

19. The non-transitory computer-readable storage medium according to claim 18, wherein
better channel quality of multiple input multiple output (MIMO) layers corresponding to the n second encoded sequences indicates higher reliability of polar channels corresponding to the n second encoded sequences.

20. The non-transitory computer-readable storage medium according to claim 15, wherein the apparatus is further caused to:
send a parameter of the first channel encoding.

* * * * *